J. WICKS

TELEPHONE SYSTEM

Aug. 15, 1933.

Original Filed Aug. 7, 1925

Re. 18,917

15 Sheets-Sheet 1

Inventor
John Wicks
R. B. Richardson Atty.

J. WICKS

Aug. 15, 1933.

TELEPHONE SYSTEM

Re. 18,917

Original Filed Aug. 7, 1925

15 Sheets-Sheet 2

Inventor
John Wicks
R. B. Richardson Atty.

J. WICKS

TELEPHONE SYSTEM

Aug. 15, 1933. Re. 18,917

Original Filed Aug. 7, 1925 15 Sheets-Sheet 3

Inventor
John Wicks
R. E. Richardson Atty.

J. WICKS

Aug. 15, 1933. TELEPHONE SYSTEM Re. 18,917

Original Filed Aug. 7, 1925 15 Sheets-Sheet 4

Inventor
John Wicks
R. B. Richardson Atty.

J. WICKS

TELEPHONE SYSTEM

Aug. 15, 1933.

Re. 18,917

Original Filed Aug. 7, 1925

15 Sheets-Sheet 5

Inventor
John Wicks
R B Richardson Atty.

J. WICKS

TELEPHONE SYSTEM

Aug. 15, 1933.

Re. 18,917

Original Filed Aug. 7, 1925

15 Sheets-Sheet 6

Inventor
John Wicks

R. B. Richardson Atty.

J. WICKS

TELEPHONE SYSTEM

Aug. 15, 1933. Re. 18,917

Original Filed Aug. 7, 1925 15 Sheets-Sheet 7

Inventor
John Wicks

R. B. Richardson Atty.

J. WICKS
Aug. 15, 1933. TELEPHONE SYSTEM Re. 18,917
Original Filed Aug. 7, 1925 15 Sheets-Sheet 8
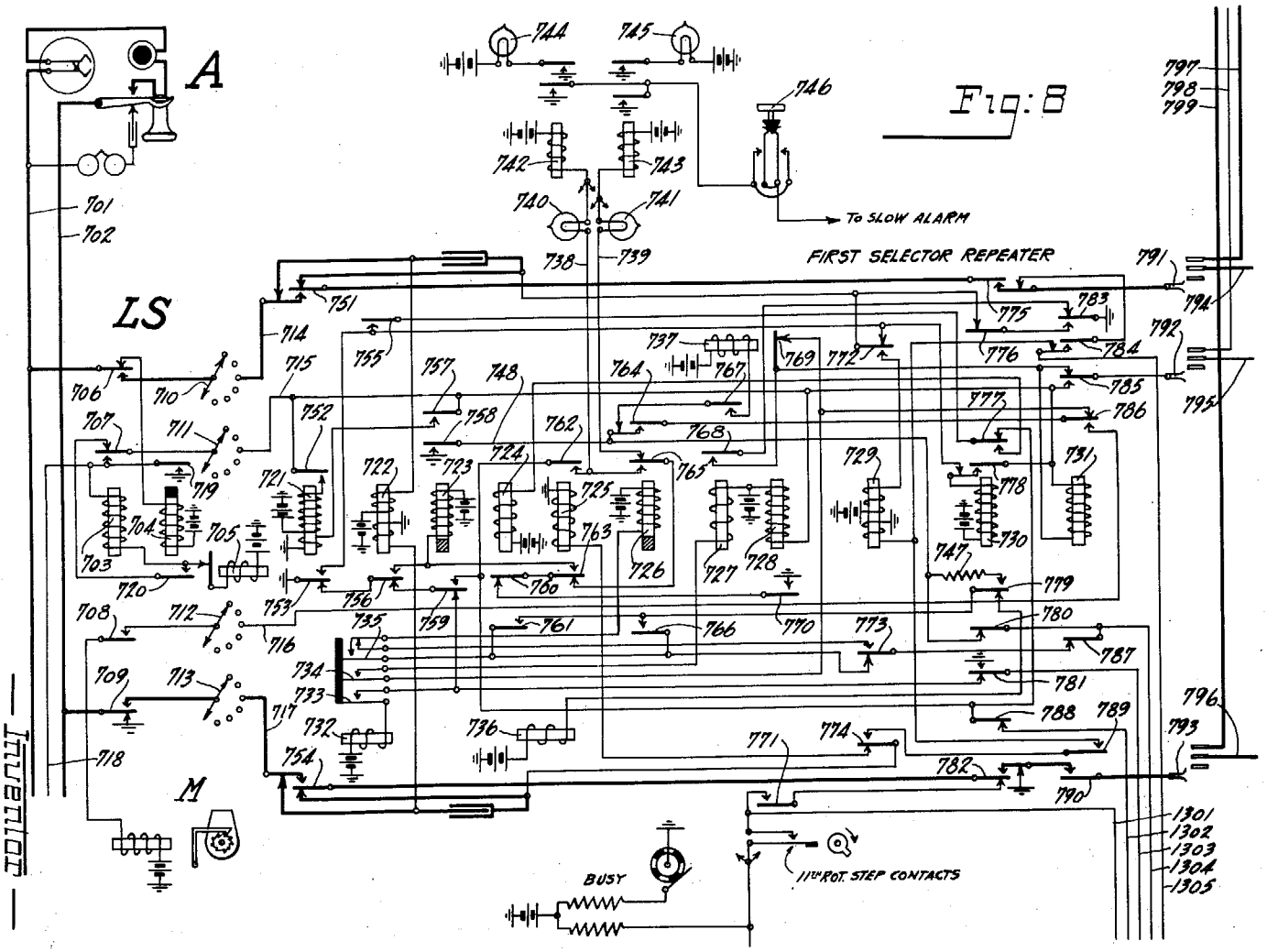
Inventor
John Wicks
R. G. Richardson Atty.

J. WICKS

TELEPHONE SYSTEM

Aug. 15, 1933.

Original Filed Aug. 7, 1925

Re. 18,917

15 Sheets-Sheet 9

Inventor
John Wicks

R. B. Richardson Atty.

J. WICKS

TELEPHONE SYSTEM

Aug. 15, 1933.

Re. 18,917

Original Filed Aug. 7, 1925

15 Sheets-Sheet 10

Inventor
John Wicks

R. B. Richardson Atty.

J. WICKS

Aug. 15, 1933. TELEPHONE SYSTEM Re. 18,917

Original Filed Aug. 7, 1925 15 Sheets-Sheet 11

Inventor
John Wicks

R B Richardson Atty.

J. WICKS

TELEPHONE SYSTEM

Aug. 15, 1933.

Re. 18,917

Original Filed Aug. 7, 1925

15 Sheets-Sheet 12

Inventor
John Wicks

R B Richardson Atty.

J. WICKS

TELEPHONE SYSTEM

Aug. 15, 1933.

Re. 18,917

Original Filed Aug. 7, 1925

15 Sheets-Sheet 13

Inventor
John Wicks

R. S. Richardson Atty.

J. WICKS

TELEPHONE SYSTEM

Aug. 15, 1933.

Original Filed Aug. 7, 1925

Re. 18,917

15 Sheets-Sheet 14

Inventor
John Wicks

R. B. Richardson Atty.

J. WICKS

Aug. 15, 1933. TELEPHONE SYSTEM Re. 18,917

Original Filed Aug. 7, 1925 15 Sheets-Sheet 15

Inventor
John Wicks
R. B. Richardson Atty.

Reissued Aug. 15, 1933 Re. 18,917

UNITED STATES PATENT OFFICE 18,917

TELEPHONE SYSTEM

John Wicks, Oak Park, Ill., assignor, by mesne assignments, to Associated Electric Laboratories, Inc., Chicago, Ill., a Corporation of Delaware Original No. 1,723,224, dated August 6, 1929, Serial No. 48,693, August 7, 1925. Application for reissue August 5, 1931. Serial No. 555,333

64 Claims. (Cl. 179—27)

The present invention relates to telephone systems in general, but as regards a number of its objects and features, it is concerned more particularly with automatic telephone systems of the so-called inverted type in which talking battery and holding potential are supplied from a first selector rather than a connector. This case may be considered as an improvement on my Patents No. 1,667,405 and No. 1,681,913 patented April 24, 1928 and August 21, 1928 respectively.

One object of the invention is the provision of arrangements whereby the switch-over operation (which takes place automatically when the final digit in a given number is dialled) is used to bring about the switch-through operation in the directors (which are employed to receive the number dialled by the calling subscriber and to route the call to the desired office and finally to the desired line). The utility of this arrangement lies in the fact that, with the switch-through operation of the director under the control of the switch-over operation in the switch train, the directors may be used in handling calls in which the telephone numbers do not contain a uniform number of digits without adding special apparatus to the director in order to cause it to be switched through and freed from the connection at one point or another in accordance with the number of digits in the telephone numbers.

Another object of the invention is the production of a new and improved toll service trunking system to operate in conjunction with the present inverted system to enable toll operators to complete the connections to the subscribers' lines through switches operating along the same line as the other switches in the system and to be able to retain the necessary supervision over the connection and to control the starting of the application of ringing current to the called line.

Another object more or less closely associated with the preceding one is the production of an arrangement whereby the intermediate selectors and the connectors in a given office may form a part of the toll service trunking system as well as a part of the regular subscriber-to-subscriber tunking system, and to this end certain novel circuit arrangements have been devised to permit the intermediate selectors and the connectors to be used in both systems, without unnecessarily complicating these switches.

According to another feature, a new and improved rotary connector has been provided for use in the inverted system to take care of the situation in which a certain subscriber desires several lines having a common call number.

Another object is the production of an arrangement whereby two offices, one containing switches operated according to the inverted system, and the other containing switches operated according to the non-inverted system, may both form part of the same multi-office trunking system, and to this end an incoming selector has been provided in the inverted office to operate responsive to the first series of impulses received from the non-inverted system, to repeat the remaining impulses to the other selectors and to the connectors, to supply talking battery to the called line, and to reverse battery to the non-inverted office when the called subscriber responds.

Another object of the invention is the provision of a new and improved impulse repeating arrangement to enable impulses to be repeated satisfactorily over long trunk lines. To this end a repeater has been provided for insertion into an outgoing trunk line when the trunk line is of great length, together with certain modifications in the distant incoming selector to adapt it to respond to the reversals of current in the trunk line brought about by the repeater to operate the switches in the distant office.

Another object of the invention is the production of an arrangement for completing calls to an operator's position and for automatically controlling the first selector repeater from the trunk line leading to the operator's position to switch through and cut-off all the bridges form the talking circuit and to hold up dependent upon ground supplied to the release trunk conductor at the operator's switchboard.

There are of course a number of objects and features subsidiary to the foregoing which may be understood best from a further perusal of the specifications.

Referring now to the accompanying drawings comprising Figs. 1–17, Figs. 1–16 show by means of the usual circuit diagrams a sufficient amount of equipment employed in a telephone system embodying the principles of the invention to enable the invention to be understood, and Fig. 17 is a diagram showing how the sheets of drawings on which Figs. 1–16 appear should be arranged in order to be understood best.

Figure 2:
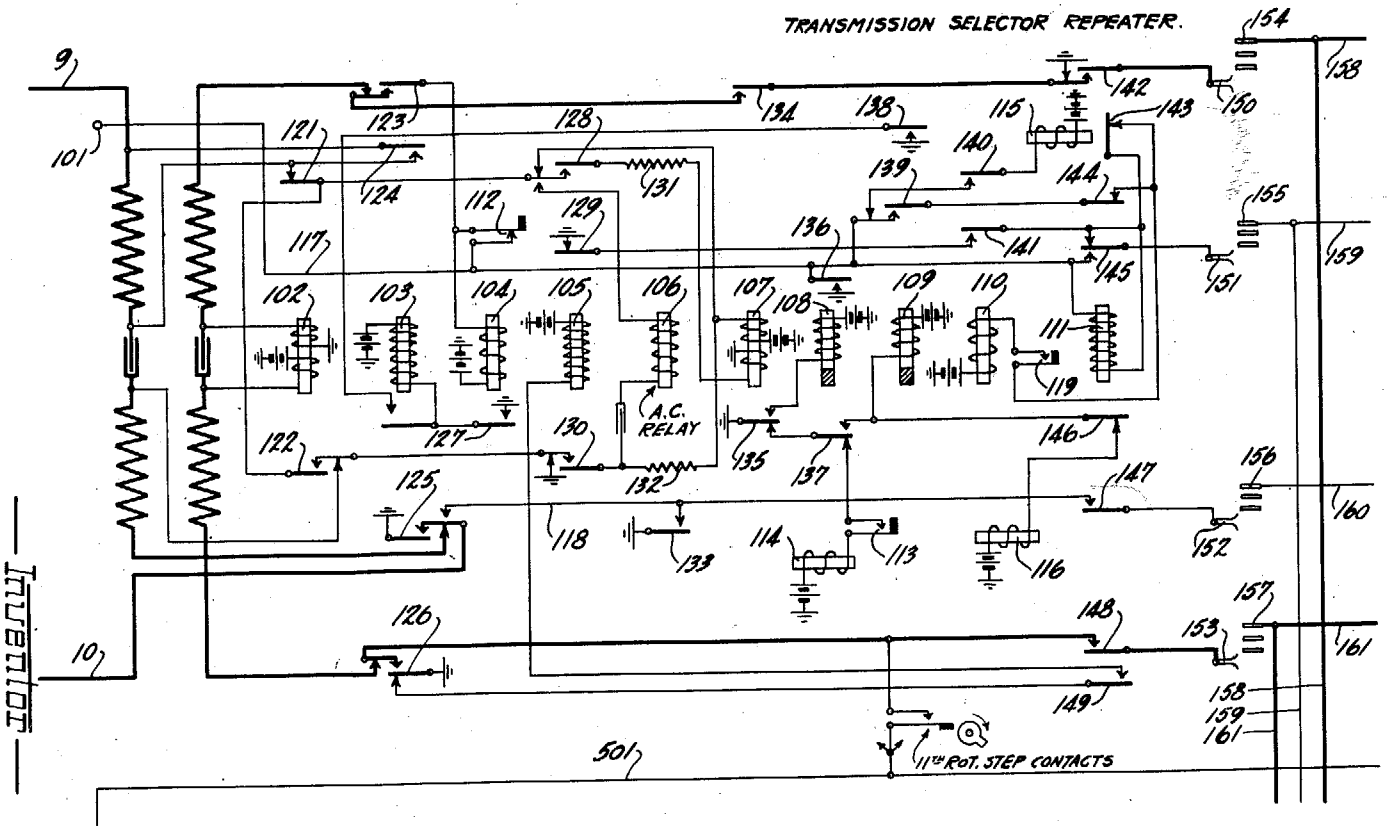
Fig. 2 shows the transmission selector repeater on the incoming end of the inter-office trunk line comprising conductors 9 and 10 and accessible to the selector S, Fig. 1. This selector repeater is of a special design so as to give the operator the correct supervision and so as to enable the operator to control the starting of the application of ringing current to the called line.
Figure 3:
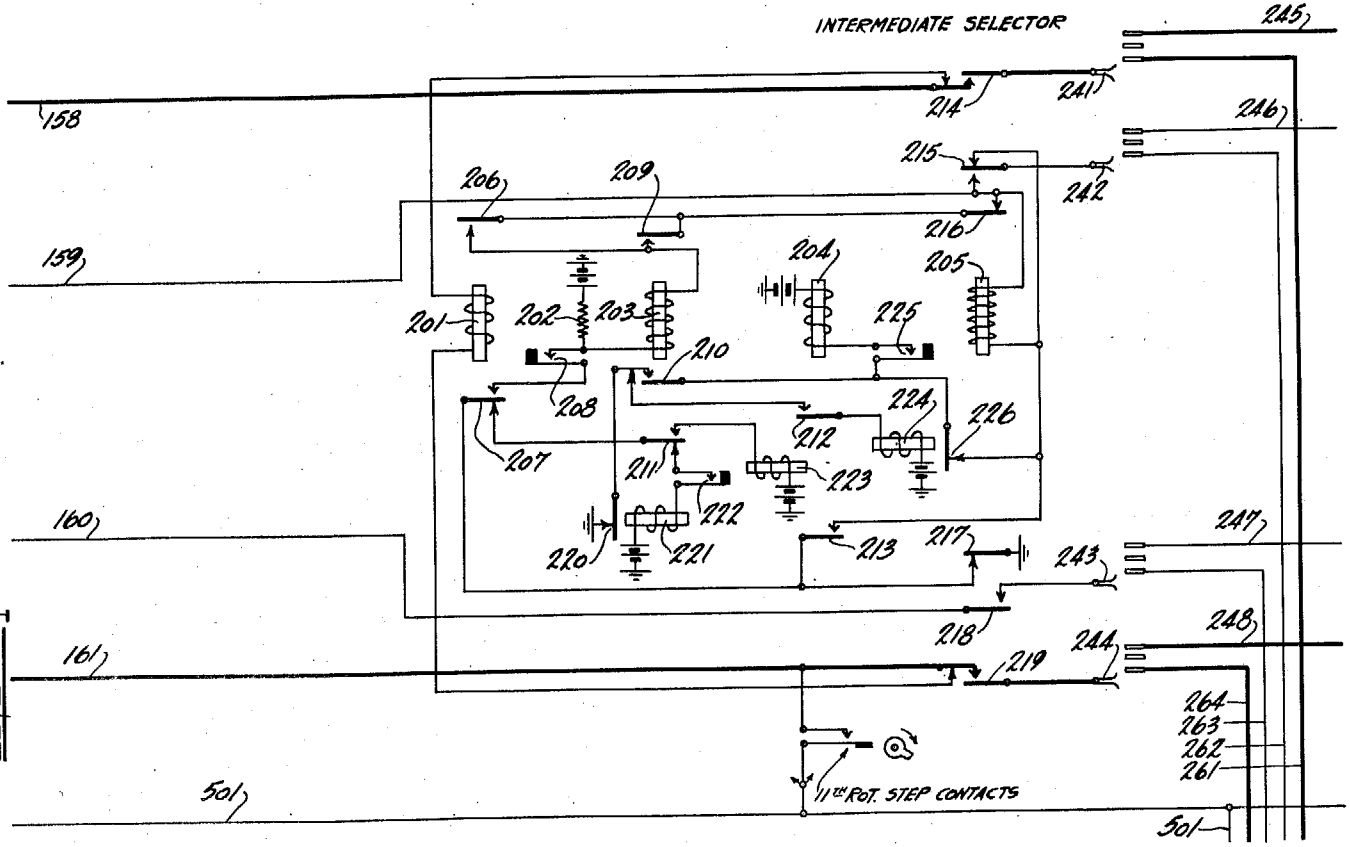

Fig. 3 shows an intermediate selector which is the term applied to the simple selectors coming in the switch train following a battery feed selector in the same office. This intermediate selector is accessible to the transmission selector repeater Fig. 2 and to the incoming selector repeaters shown in Figs. 11 and 12. This selector has the usual line and release trunk conductors and it also has an extra conductor 160 coming into it from the transmission selector repeater and passing out through the wiper 243 for the purpose of controlling the ringing operation of the connectors. The conductor 160 accordingly is local to the transmission selector repeaters and does not multiple down to the incoming selector repeaters shown in Figs. 11 and 12.

Figure 4:
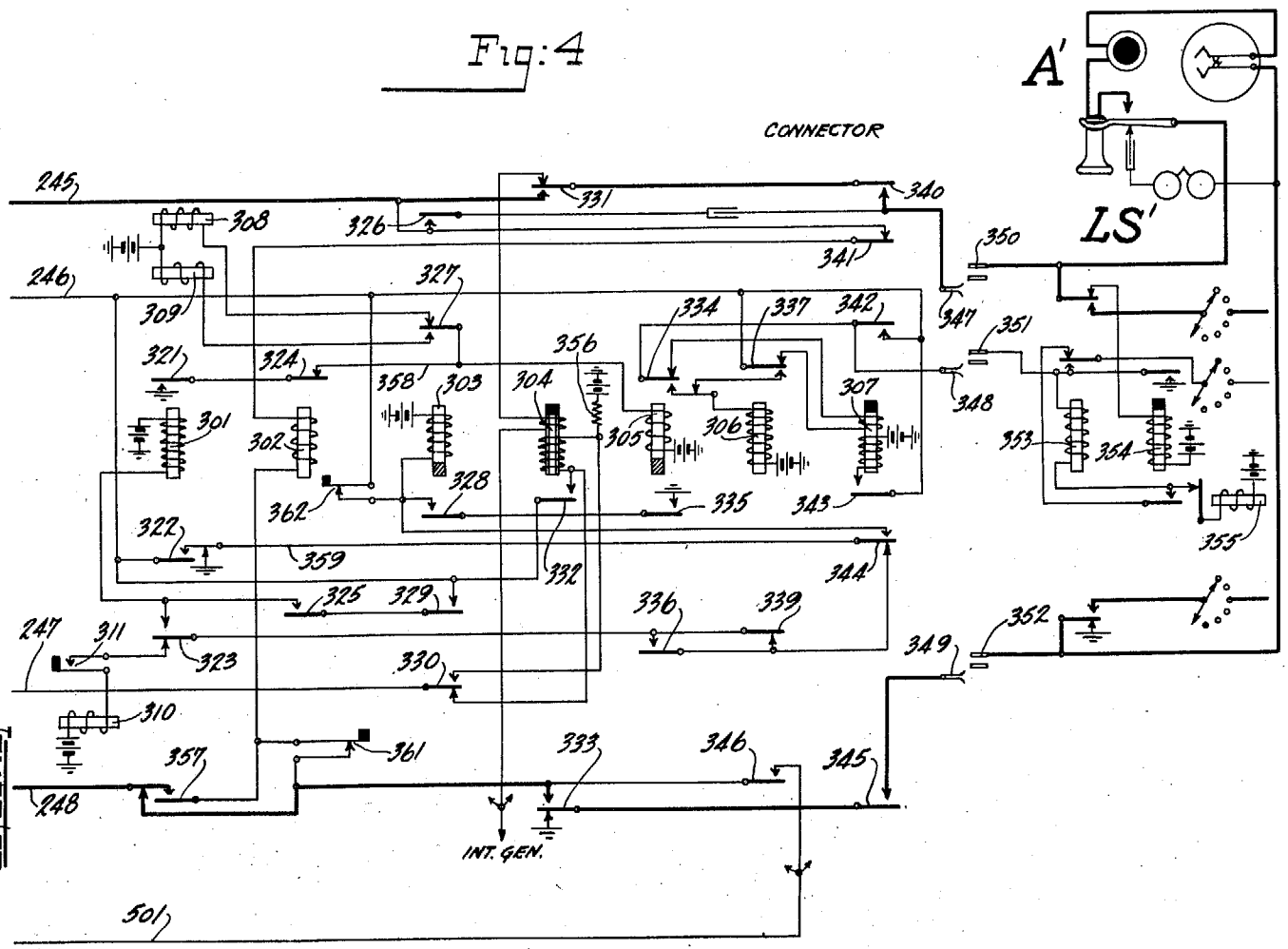

Fig. 4 shows a combination toll and regular connector which is accessible to the intermediate selector shown in Fig. 3, and, which has access to the line of substation A' and to other lines.

Figure 5:
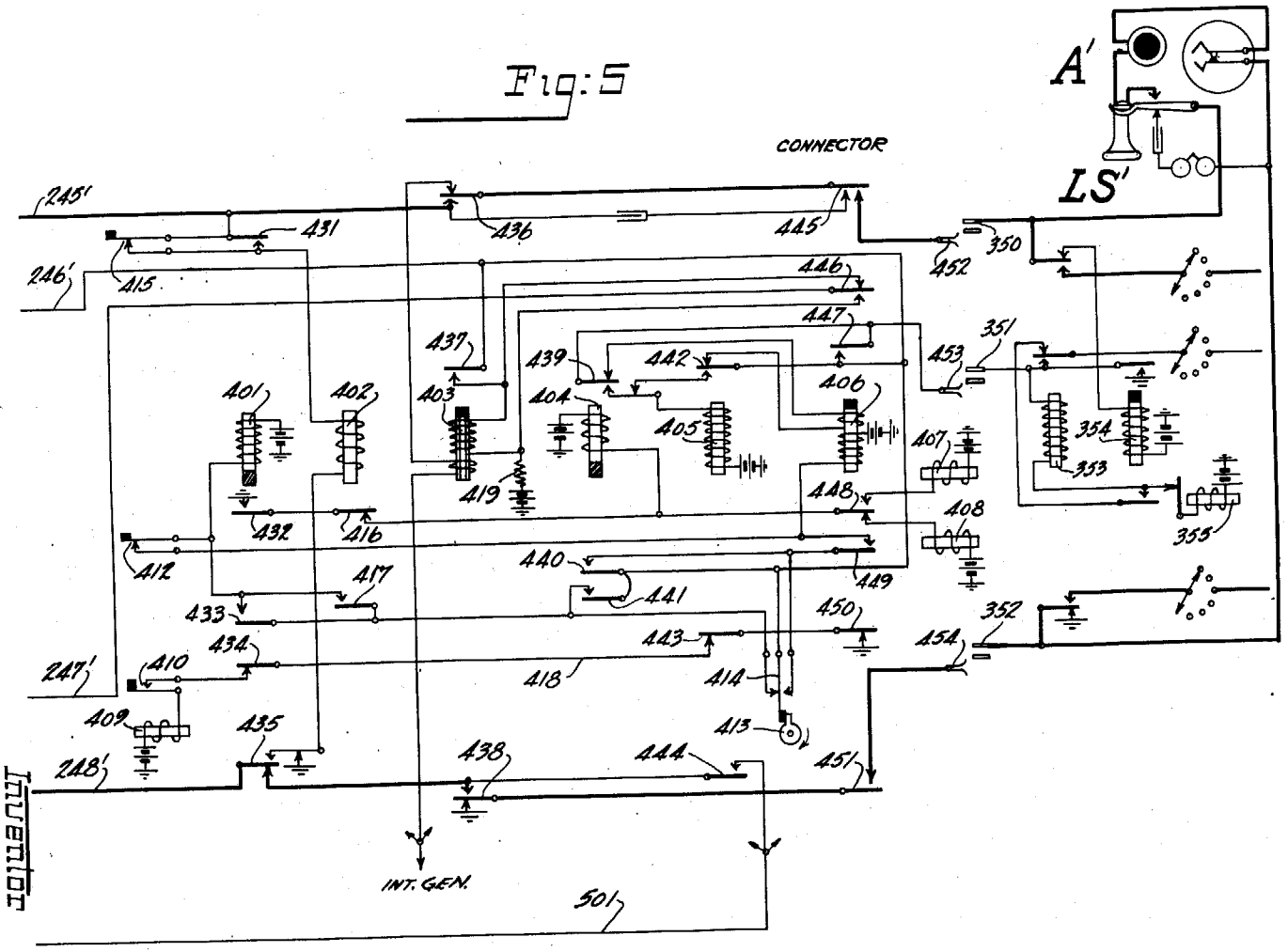

Fig. 5 shows a connector similar to the connector of Fig. 4, except that the function performed by relays 303 and 307 of Fig. 4 is performed by relay 406, Fig. 5, with the aid of the rotary off-normal spring 414 and its associated contact.

Figure 6:
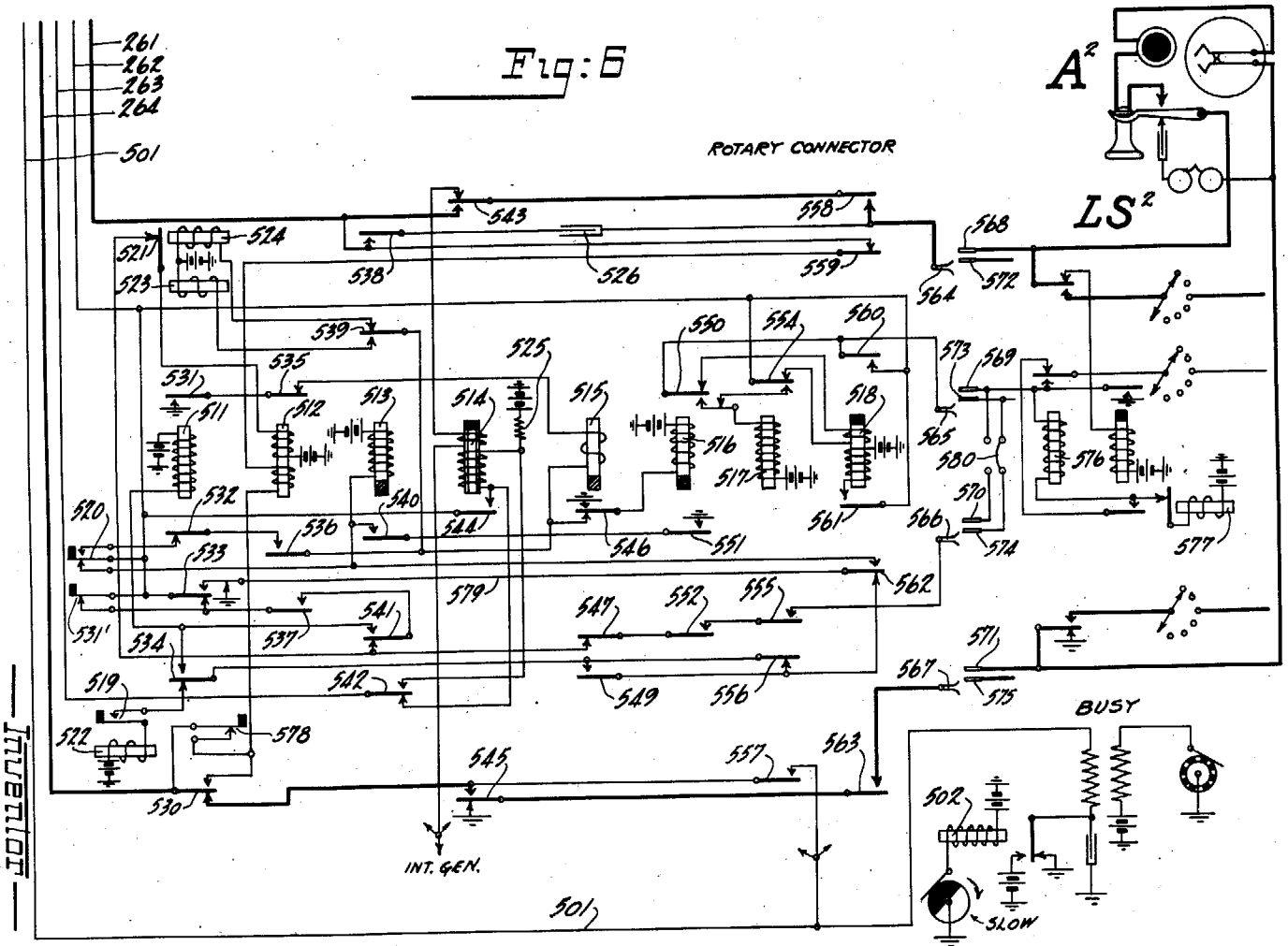

Fig. 6 is a rotary connector switch which is otherwise similar to the connector shown in Fig. 4, and it is used for calling ordinary lines and also for lines associated in groups with the number of the first line assigned as the call number of the entire group.

Figures 7, 17:
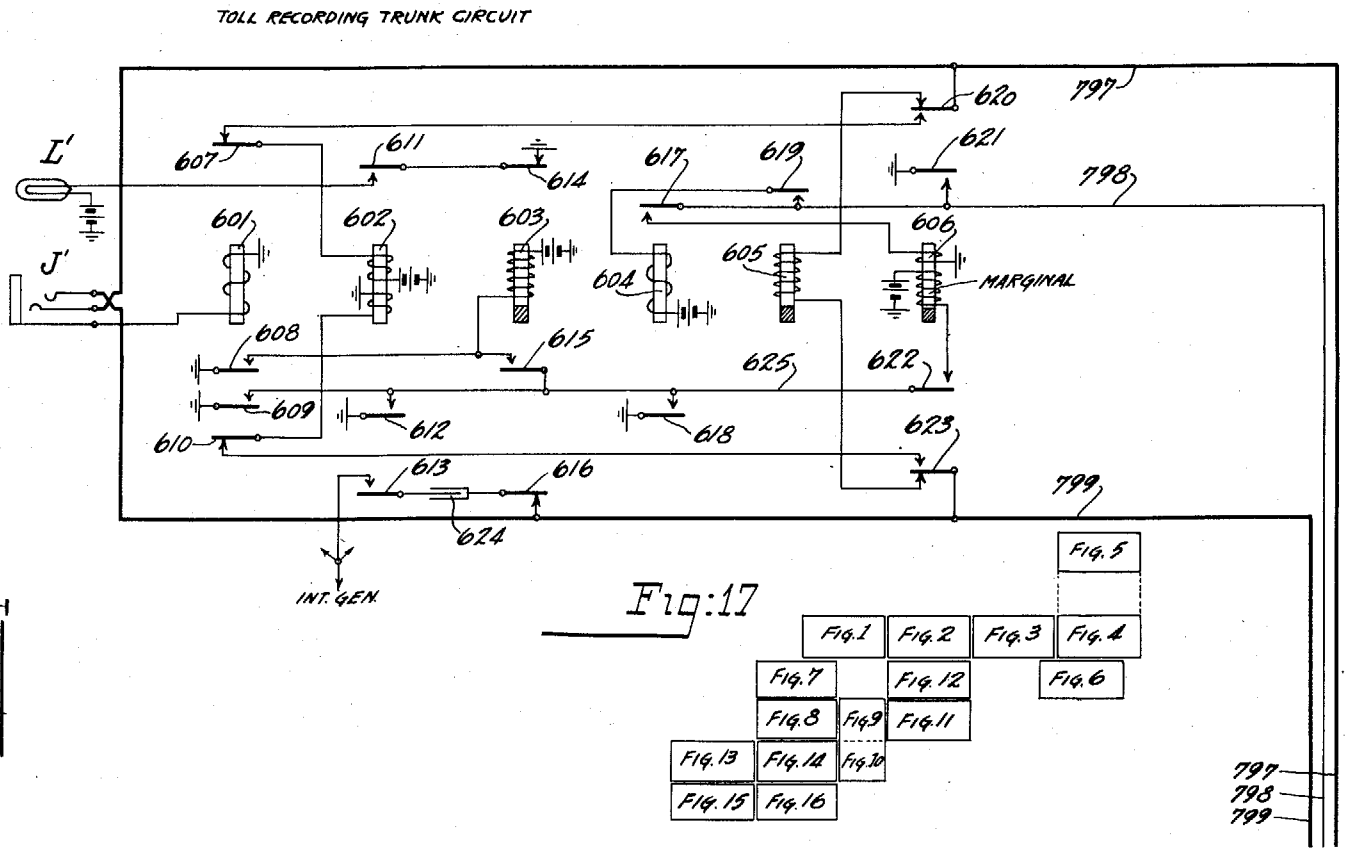

Fig. 7 shows a toll recording trunk circuit which is accessible to the first selector repeater shown in Fig. 8 through the conductors 797–798. This trunk circuit is used for extending connections to the toll recording operator and it brings about the operation of the switch-through relay 721 of the first selector repeater, Fig. 8, so as to remove all bridges at the first selector repeater to give a clear talking circuit through to the manual switchboard.

Fig. 8 shows the first selector repeater which is accessible to the line switch LS associated with the line of the substation A. This selector repeater is provided with the necessary arrangements for feeding talking battery to the calling subscriber in all cases and to the called subscriber on local calls. It is also provided with the necessary arrangements for cooperating with the director shown in Figs. 13–16.

Figure 9:
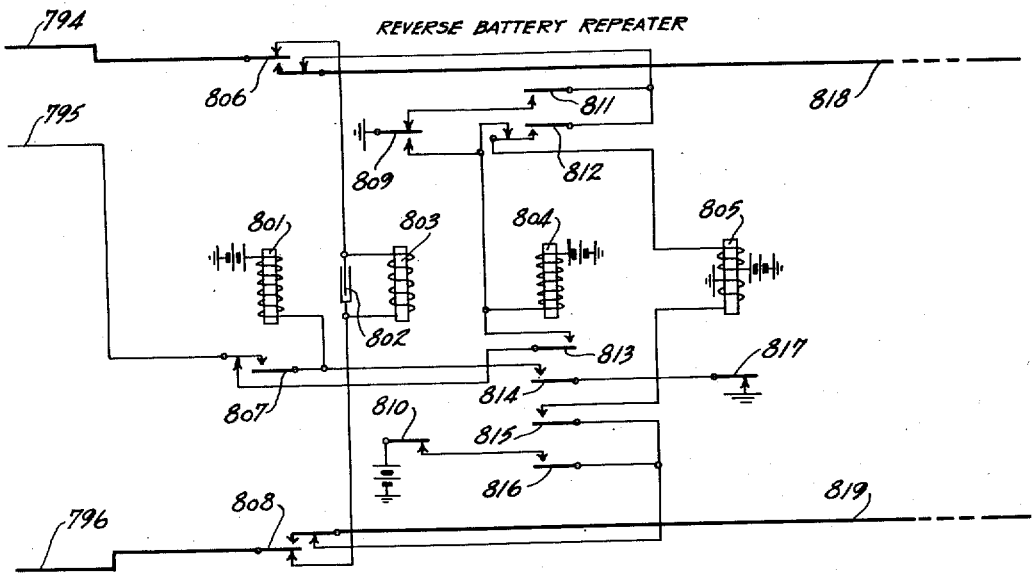
Figure 11:
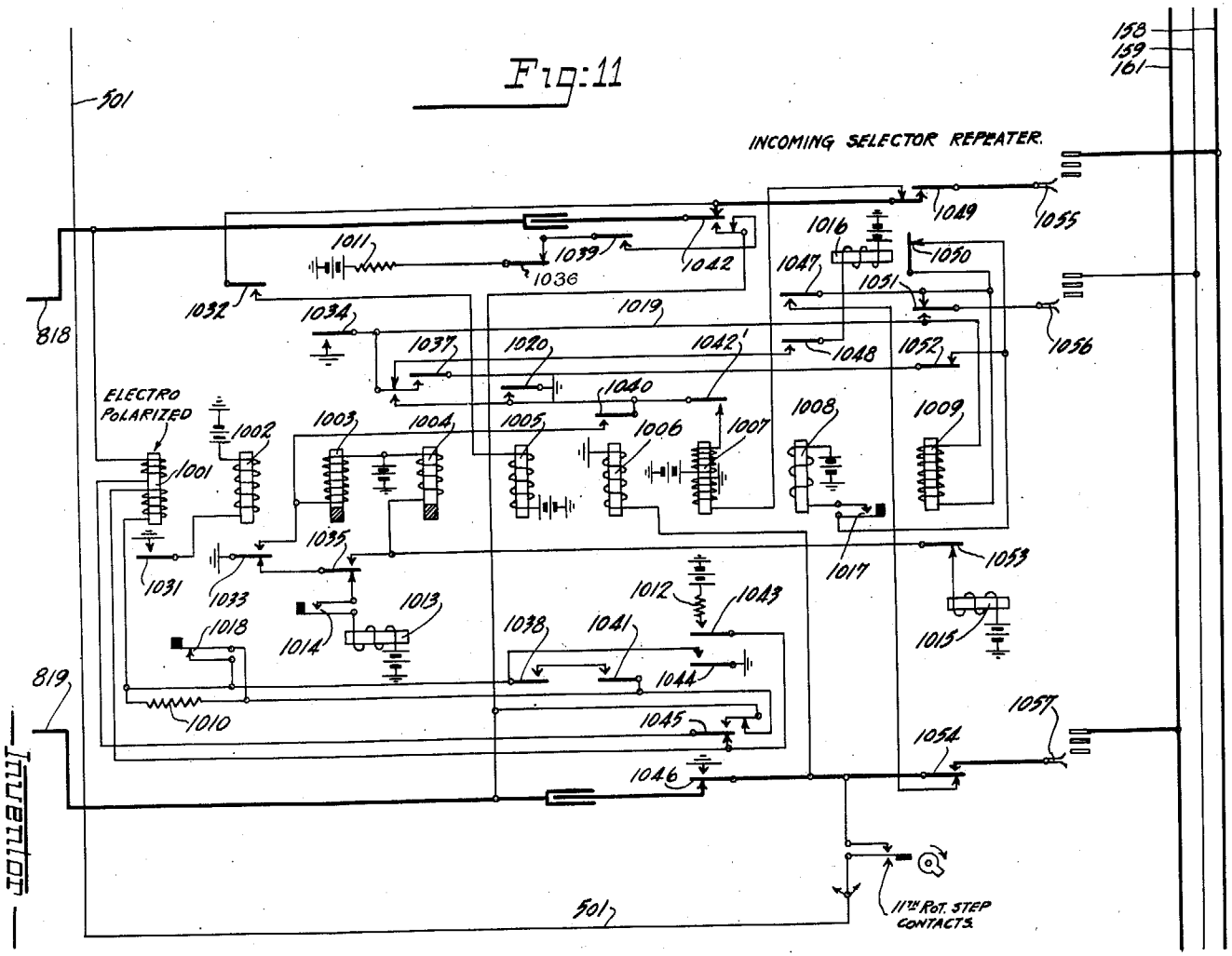

Fig. 9 shows a reverse battery repeater which responds to the impulses received by the line relay 803 to reverse the direction of the current flow over the conductors 818 and 819 to operate the electro-polarized relay 1001, Fig. 11, to bring about the operation of the automatic switches in the distance office.

Figure 10:
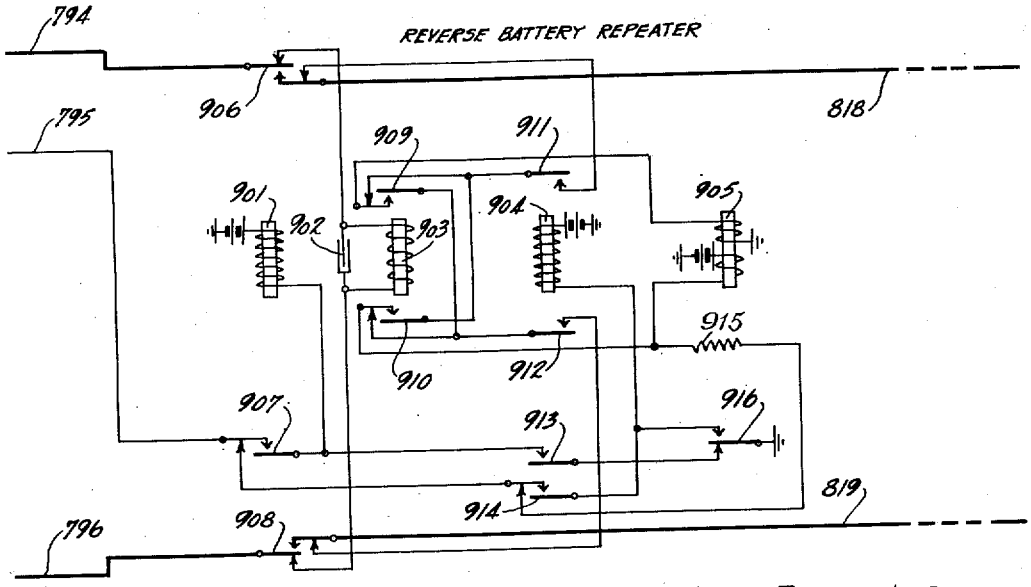

Fig. 10 shows a reverse battery repeater somewhat similar to the one shown in Fig. 9, but differing somewhat in detail as will be pointed out hereinafter.

Fig. 11 shows an incoming selector repeater accessible to the first selector repeater shown in Fig. 8 through the trunk line comprising conductors 818 and 819. This incoming selector repeater is designed to operate responsive to the reverse battery impulses transmitted by the reverse battery repeaters shown in Figs. 9 and 10. It also supplies talking battery to the called line and it controls the switch-over and metering operations of the first selector repeater shown in Fig. 8.

Figure 12:
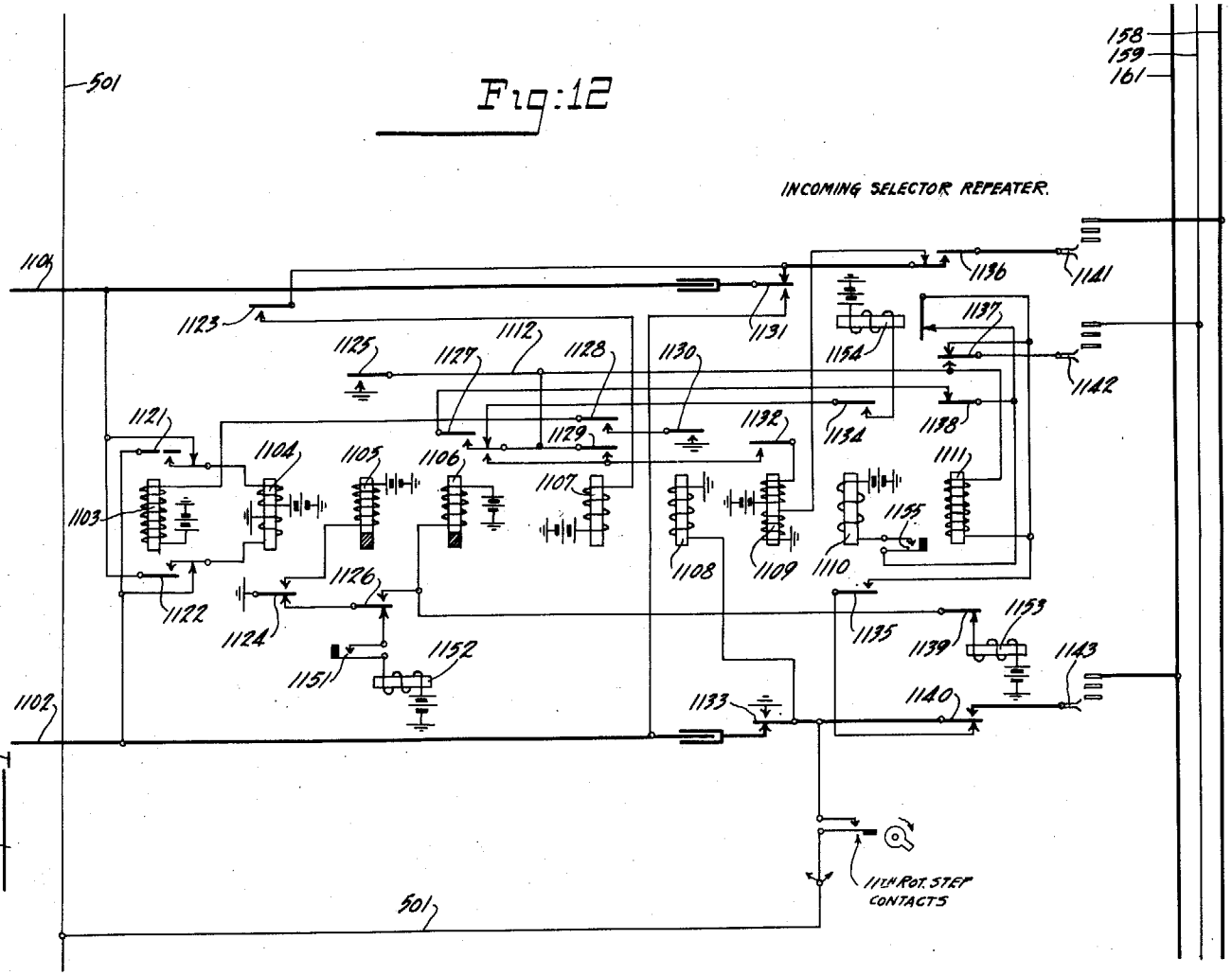

Fig. 12 shows an incoming selector repeater which performs functions similar to those of the incoming selector repeater shown in Fig. 11 as regard the supplying of talking battery to the called line, but instead of being accessible to a first selector repeater operating in the inverted system, it is accessible to an ordinary two wire selector in a distant office through the medium of the usual outgoing repeater.

Figs. 13–16 taken together show a director selector individual to the first selector repeater, Fig. 8, and one of the directors accessible to the director selector.

Figure 13:
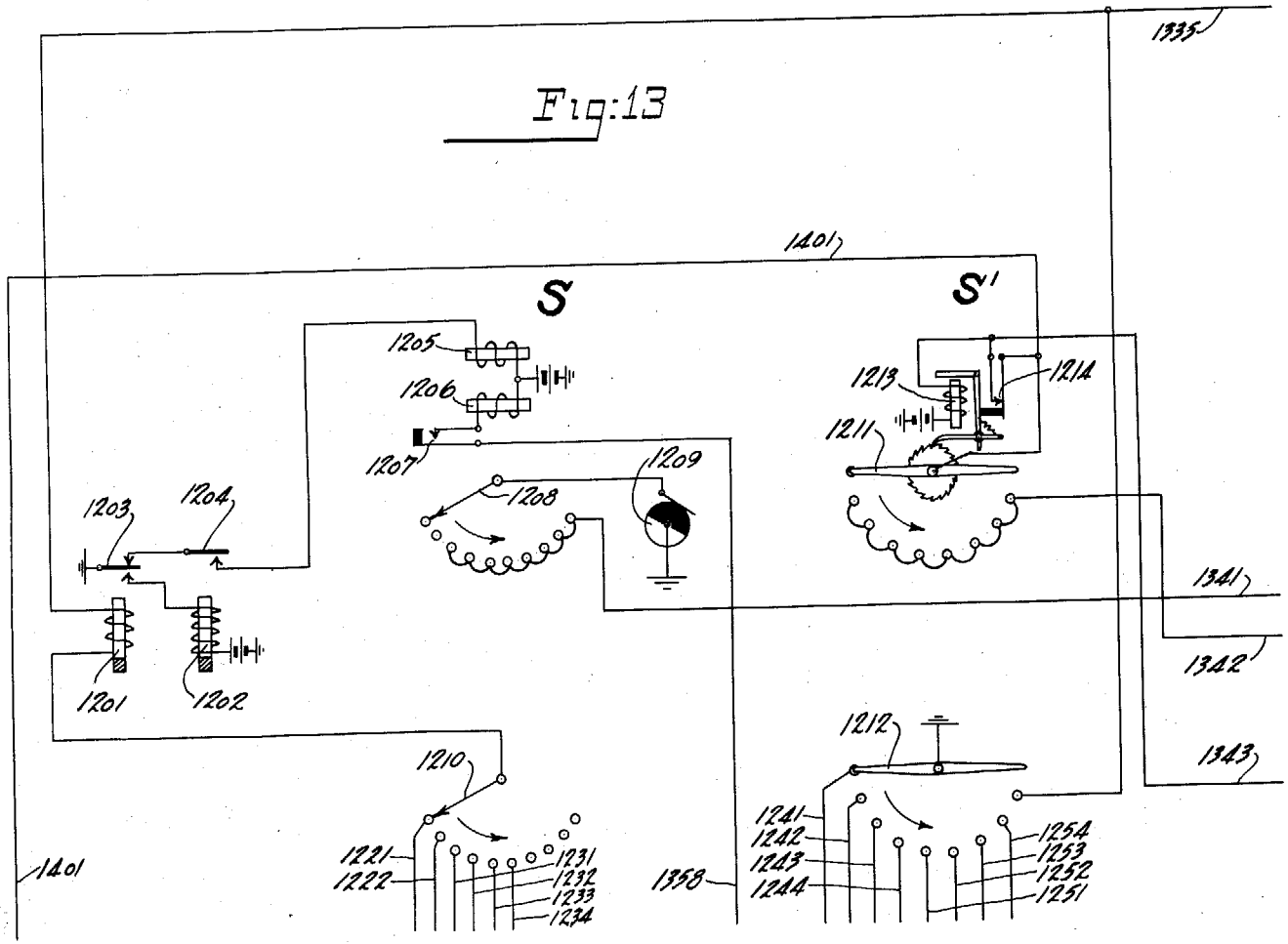

The portion of the director shown in Fig. 13 comprises the sequence switch S which is used to distribute the various series of impulses received by the director to the various operating magnets of the registers concerned. This drawing shows also the sequence switch S' which is used to control the various steps in the sending operation as will hereinafter appear.

Figure 14:
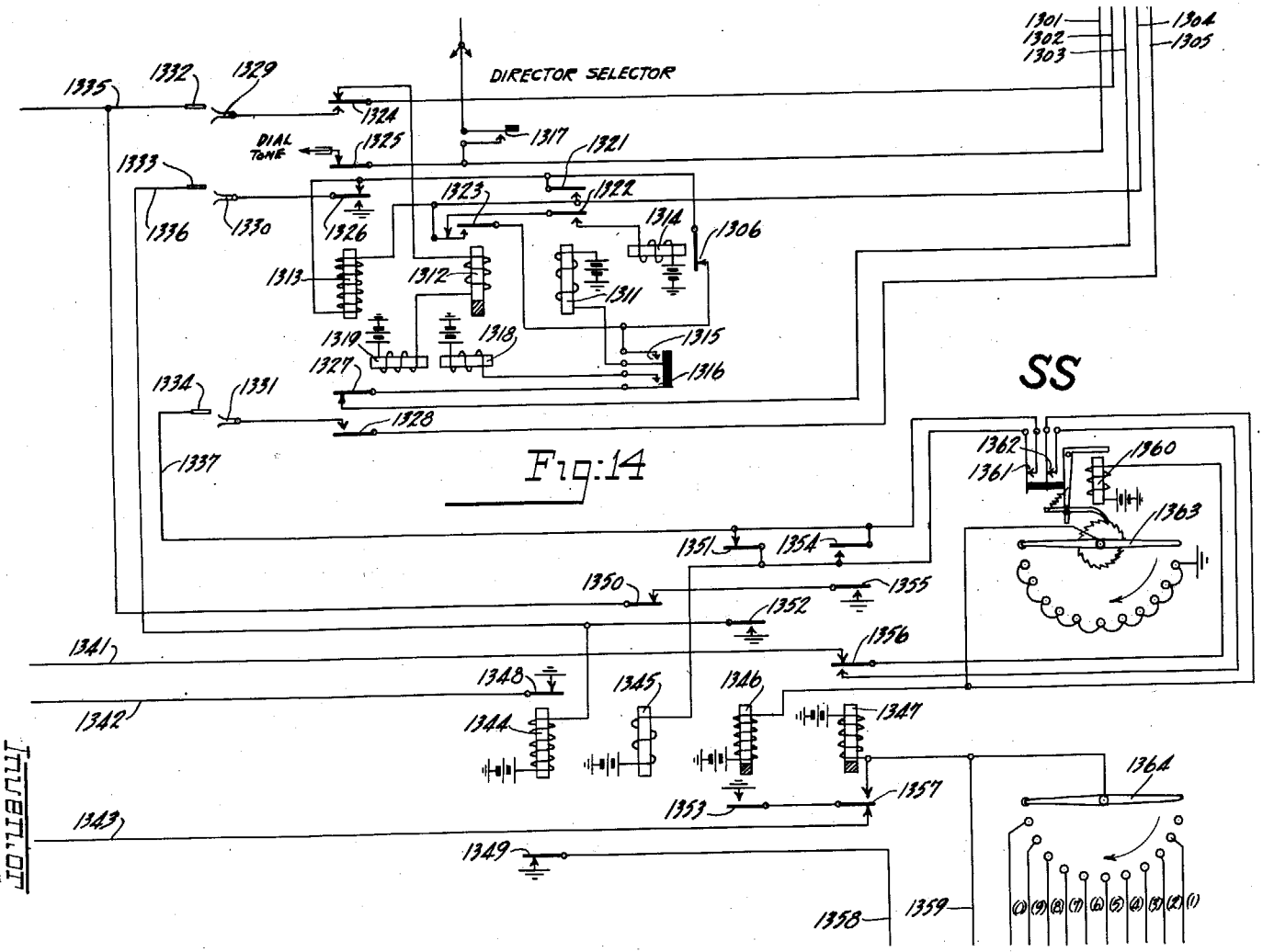

Fig. 14 shows the director selector which responds to the first office digit to select a director in the proper group. This drawing shows also the sending portion of the director, which comprises the pick-up and stop relays 1246 and 1247, together with the sending switch SS which counts the impulses as they are being transmitted and consequently terminates the transmission when the required number has been transmitted in a given case.

Figure 15:
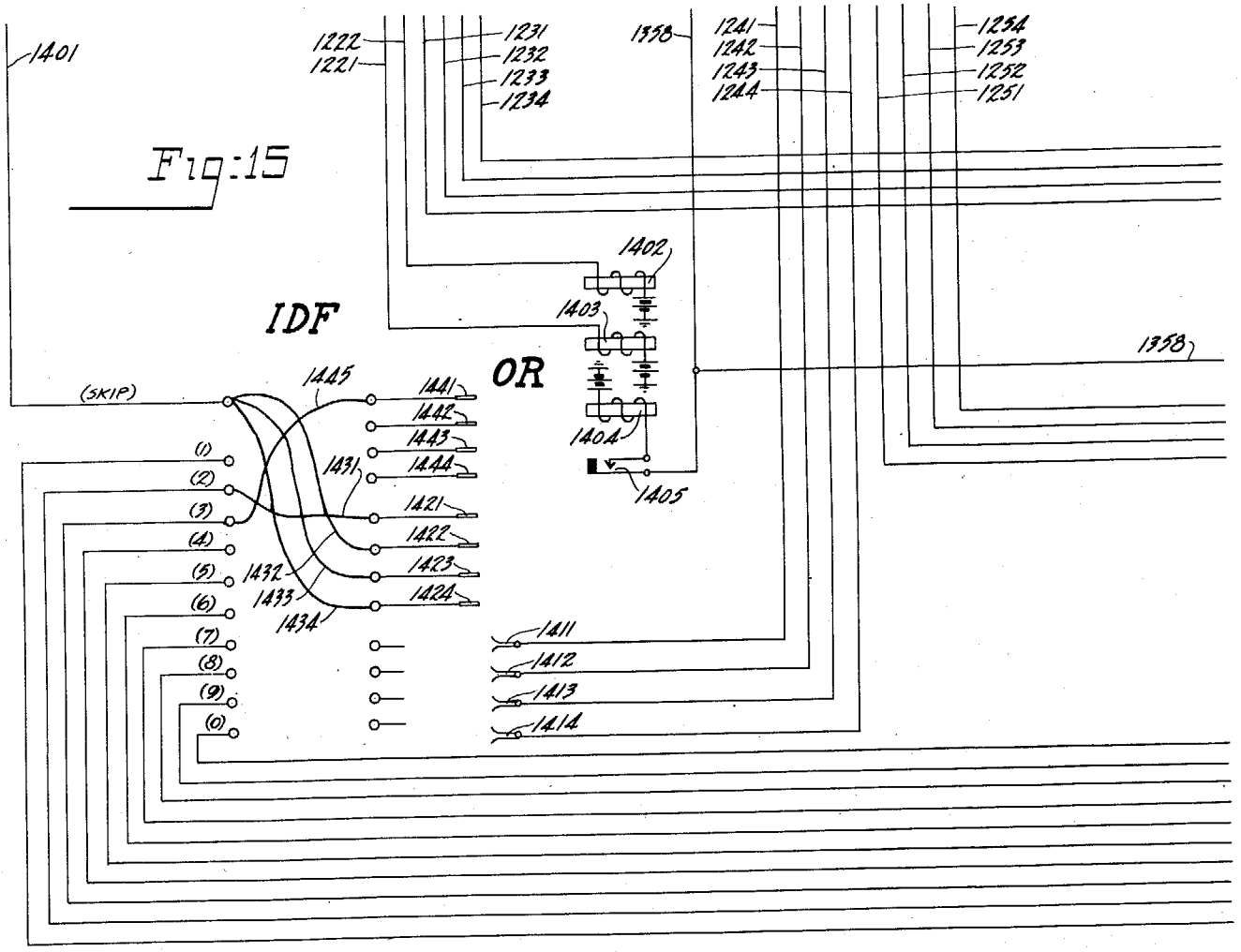
Figure 15:
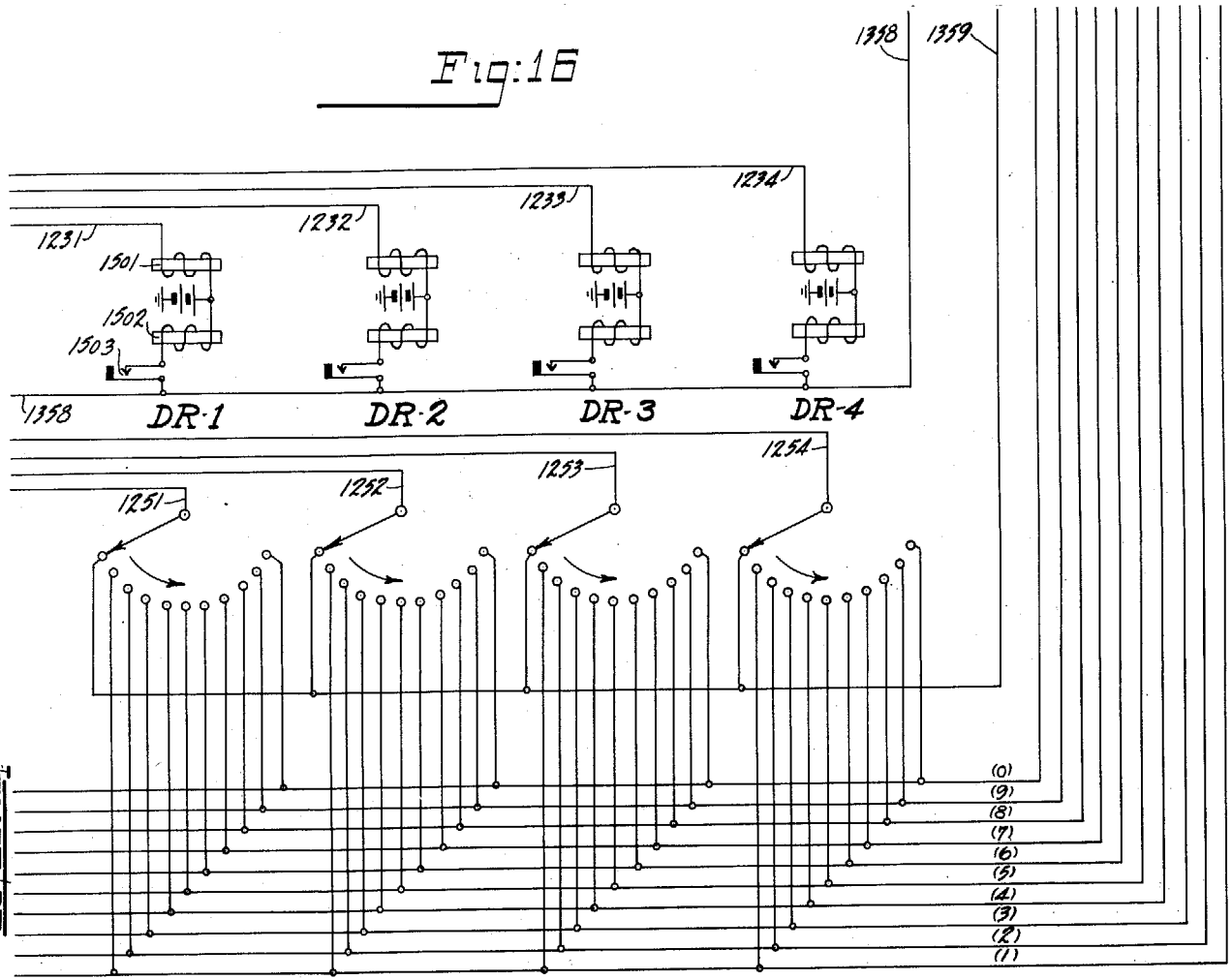

The portion of the director shown in Fig. 15 comprises the office register OR which responds to the second and third office digits, together with the intermediate distributing frame IDF through the medium of which the code digits transmitted on calls to any office may be altered at will.

The portion of the director shown in Fig. 16 comprises the four digit registers DR—1–DR—4 which are used to register the four subscriber digits in a number after the office digits have been taken care of by the director selector, Fig. 14, and by the office register OR Fig. 16.

Regarding the mechanical construction of the apparatus shown, the various selectors, selector repeaters and connectors are mechanically of the well-known vertical and rotary type of switch in which the bank contacts are arranged in horizontal rows or levels. The office register OR, Fig. 15, is also of this type.

The various line switches such as LS are mechanically of the well known rotary type of switch in which the wipers are advanced in one direction only and are advanced upon the back stroke of the associated stepping magnet. The same is true of the sequence switch S', Fig. 13, and the sending switch SS, Fig. 14.

The sequence switch S, Fig. 13, is a switch of a simple type in which the wipers are advanced in one plane only by the operating magnet 1205 and are restored to their normal position by the release magnet 1206 under the control of the off-normall contacts 1207. The digit registers DR—1–DR—4, Fig. 16, are of the same type of switch mechanically.

The invention having been described generally, a detailed description of the operation of the apparatus shown will now be given. For this purpose it will be assumed that the subscriber at substation A, desiring to converse with the subscriber at substation A', removes his receiver and dials the digits in the number of the subscriber at substation A'.

*Call from substation A to substation A'*

When the receiver is removed at the substation A, a circuit is closed over line conductors 701 and 702 for line relay 704 of the line switch LS. Line relay 704 energizes over the calling line and places ground on the associated private normal conductor 718 leading to the banks of the connector switches having access to the line of substation A, thereby making this line busy to those connectors, and also closing a circuit through the combined switching and cut-off relay 703 and the motor magnet 705. Line relay 704 also at armature 720 connects test wiper 711 through armature 707 and its resting contact to the junction of relay 703 and magnet 705. Accordingly, if the trunk upon which the wipers of the switch are standing is busy the ground potential encountered by test wiper 711 shunts relay 703 and prevents it from energizing and affords a direct circuit for the self interrupting stepping magnet 705. Accordingly stepping magnet 705 operates in a buzzer-like manner to advance the wipers 710—713 in search of an idle trunk line.

When an idle trunk line is reached, the stepping magnet 705 ceases to operate, and relay 703, being no longer short circuited, energizes in series with stepping magnet 705, which however does not operate at this time on account of the relatively high resistance of relay 703. Upon operating, relay 703 disconnects test wiper 711 from the junction of its own winding and that of magnet 705 and connects it to the grounded private normal conductor 718, thereby extending ground to the release trunk conductor 715 of the seized trunk; connects up the meter operating wiper 712 at armature 708; and at armatures 706 and 709 disconnects conductors 701 and 702 from line relay 704 and ground and extends them by way of wipers 710 and 713, conductors 714 and 717, and the normally closed contacts controlled by armatures 751 and 754 to the windings of line relay 722 of the first selector repeater. Line relay 722 now energizes over the calling line and closes at armature 756 a circuit for the release relay 723. Relay 723 energizes and places ground on the local-ground supply conductor 748 at armature 758, prepares the vertical magnet circuit at armature 759; and at armature 757 places ground through the low resistance lower winding of relay 721 on the release trunk conductor 715 to maintain the switching relay 703 of the line switch LS operated and to maintain the calling line guarded after the falling back of the slow acting line relay 704. Although the current for holding switching relay 703 operated is obtained through the lower winding of relay 721, the proportion between the windings of the two relays is such that relay 721 is not operatively energized at this time, nor is it operatively energized in case several other holding relays obtain their current through its lower winding. The function of this winding will be brought out hereinafter.

The calling subscriber now manipulates his calling device in accordance with the first digit in the desired number, being informed of the condition of readiness of the exchange apparatus by the dial tone current transmitted to the calling line from the dial tone lead, Fig. 14, through the resting contact and armature 1325, conductor 1301, working contact and armature 771 of relay 728, which is energized from release trunk conductor 715, and the resting contact and armature 782.

When the calling subscriber turns his calling device, the circuit of line relay 722 of the first selector repeater is interrupted a corresponding number of times. Each time it falls back, line relay 722 closes at armature 756 a circuit for the vertical magnet 1319 of the director selector, Fig. 14 as follows: from ground by way of armature 753 and its resting contact of relay 721 of the first selector repeater, armature 756 of line relay 722 and its resting contact, armature 759 and its working contact, armature 788 and its resting contact, conductor 1302, armature 1324, relay 1312, and vertical magnet 1319 to battery. By the operation of vertical magnet 1319 the wipers 1329–1331 are raised step by step and come to rest opposite the desired level of bank contacts. Relay 1312 is energized in series with vertical magnet 1319 upon the first impulse of current being delivered to the latter, and is maintained energized throughout the series of impulses to the vertical magnet on account of the fact that it is slow acting. At armature 1323 relay 1312 prepares a circuit for the stepping relay 1311 and opens a point in the circuit of rotary magnet 1314. As soon as the off-normal contacts 1315 operate, as they do upon the completion of the first vertical step, the circuit of relay 1311 is completed as follows: from ground by way of the grounded conductor 748, Fig. 8, resting contact and armature 780, conductor 1304, working contact and armature 1323, off-normal contacts 1315, and stepping relay 1311 to battery. Relay 1311 energizes over the above circuit and prepares at armature 1322 a circuit for rotary magnet 1314, and at armature 1321 places a shunt around the switching relay 1313, thereby completing a locking circuit for itself from the grounded conductor 1304 through the working contact and armature 1321, interrupter contacts 1306, and the off-normal contacts 1315.

At the end of the vertical movement, relay 1312 falls back and completes the rotary magnet circuit at the normally closed contacts controlled by armature 1323, whereupon rotary magnet 1314 energizes and advances the wipers 1329—1331 into engagement with the first set of bank contacts in the selected level, and near the end of its stroke, it opens at interrupter contacts 1306 the locking circuit of relay 1311, whereupon relay 1311 falls back and opens the circuit of rotary magnet 1314 at armature 1322, and opens a further point in its own locking circuit at armature 1321. Rotary magnet 1314 now falls back and closes its interrupter contacts 1306 again.

The further operation depends upon whether the first set of contacts in the selected level is busy or idle. If this set of contacts is idle, switching relay 1313 energizes right away, seizing the associated director. Assuming, however, that the director associated with this set of contacts is busy, there is a grounded potential on the test contact encountered by test wiper 1330, with the result that switching relay 1313 is shunted and does not operate and that a circuit is closed for stepping relay 1311 which energizes and closes a circuit for rotary magnet 1314 with the result that the wipers 1329—1331 are advanced another step.

This alternate operation of relay 1311 and rotary magnet 1314 continues until an idle set of bank contacts is reached, which set it will be assumed is the one comprising conductors 1332—1334. When this idle set of bank contacts is reached, stepping relay 1311 is unable to operate over test wiper 1330, and switching relay 1313 (being no longer short circuited) energizes in series with relay 1311, which latter relay is unable to energize on account of the relatively high resistance of relay 1313. Upon energizing, relay 1313 opens a point in the test circuit and grounds the wiper 1330 at armature 1326; opens a point in the circuit of release magnet 1318 at armature 1327; and at armature 1325 disconnects the dial tone lead from conductor 1301; at armature 1324 disconnects the impulse conductor 1302 from the local vertical magnet circuit and extends it by way of the working contact of armature 1324 to wiper 1329; and at armature 1328 connects up wiper 1331.

In the seized director, the switch-through-control relay 1345, which is associated with the outgoing control conductor 1337, now energizes in series with the lower winding of relay 729 of the first selector repeater, Fig. 8, over the following circuit: from ground by way of the lower winding of the impulse relay 729, Fig. 8, normally closed contacts controlled by armature 784, conductor 1305, armature 1328 and its working contact, wiper 1331, bank contact 1334, conductor 1337, resting contact and armature 1351 in multiple with the sending contacts 1361, and the switch-through-control relay 1345 to battery. The two relays 729 and 1345 energize in series over this circuit and relay 1345 opens at armature 1350 a point in the switch-through circuit so as to prevent a premature operation of the switch-through relay 730 of the first selector repeater, Fig. 8, when the stop relay 1347 of the sender operates.

In the first selector repeater, relay 729, upon energizing, prepares a locking circuit for its upper winding at armature 772, and at armature 773 opens a point in the circuit of vertical magnet 736 and closes a circuit for relay 726 as follows: from ground by way of the grounded conductor 748, resting contact and armature 780, armature 787 and its resting contact, armature 773 and its working contact, normally closed off-normal springs controlled by spring 735, and relay 726 to battery. Relay 726 now energizes and prepares a circuit for stepping relay 727 at armature 764, and at armature 766 prepares a circuit for vertical magnet 736.

In the seized director, release relay 1344 energizes through the grounded test wiper 1330 of the director selector, bank contact 1333, and the release trunk conductor 1336 and removes ground from the release conductors 1342 and 1358.

The calling subscriber now manipulates his calling device in accordance with the remaining digits in the desired number, and when the next digit is dialled, the resulting impulses of current transmitted by line relay 722 of the first selector repeater are transmitted over the previously traced circuit through conductor 1302 to armature 1324 of the director selector and thence by way of the working contact of armature 1324, wiper 1329, bank contact 1332, conductor 1335, slow acting series relay 1201, Fig. 13, distributing wiper 1210 of the sequence switch S, vertical magnet operating conductor 1221, and vertical magnet 1402, Fig. 15, of the office register OR to battery. Accordingly, the vertical magnet 1403 operates to raise the wipers 1411—1414 of the office register OR to a position opposite the desired level of bank contacts of the office register. Relay 1201 is energized in series with vertical magnet 1401 on the first impulse of current and, being slow acting, maintains its armature 1203 attracted throughout the vertical operation. Upon energizing, relay 1201 closes a circuit for the associated slow acting relay 1202 which operates and prepares at armature 1204 a circuit for magnet 1205 of the sequence switch S.

At the end of the digit, relay 1201 falls back and completes at armature 1203 the circuit through armature 1204 and its working contact for stepping magnet 1205 whereupon the wiper 1208 and 1210 are advanced one step. The slow acting relay 1202 falls back shortly and opens the stepping magnet circuit at armature 1204.

When the next digit is dialled, the resulting series of impulses is transmitted over the circuit previously traced to the wiper 1210 of the sequence switch S, and from thence over the rotary magnet operated conductor 1222 to the rotary magnet 1402 of the office register OR. Rotary magnet 1402 operates to advance the wipers of the office register into engagement with the desired set of bank contacts, which set it will be assumed is the one comprising contacts 1421—1424.

The wipers 1208 and 1210 of the sequence switch S are advanced at the end of the rotary movement in the manner above described, wiper 1210 extending the operating conductor to conductor 1231 and wiper 1208 connecting the interrupter 1209 to the starter conductor 1341 leading to the sender, Fig. 14. This latter operation results in the starting of the sender to transmit the necessary digit combination to trunk the call to the called office, as will be later explained.

When the next digit is dialled, the resulting impulses of current are transmitted over the conductor 1231 to stepping magnet 1501 of the digit register DR—1 with the result that the wiper of this register is set on the corresponding bank contact.

Similarly, the next three series of impulses are transmitted over conductors 1232—1234 to the stepping magnets of the digit registers $DR^2$–$DR^4$ respectively, with the result that their respective wipers are set on the corresponding bank contacts.

The wipers 1208 and 1210 of the sequence switch S of course are advanced in the usual manner at the end of each series of impulses, and at the end of the last series, wiper 1210 advances to a dead contact and the wipers remain in this position until the director is released.

Reverting now to the point at which the interrupter 1209 is connected to conductor 1341 at wiper 1208 of the sequence switch S′ at the end of the setting of the office register OR, upon the first subsequent closure of the interrupter 1209 an impulse of current is transmitted over conductor 1341 and through the resting contact and armature 1356 to the stepping magnet 1360 of the sending switch SS. Magnet 1360 thereupon energizes preparatory to advancing the wipers 1363 and 1364 and it falls back and advances these wipers one step when the impulse is terminated. Wiper 1364 engages a dead contact, but wiper 1363 encounters a grounded contact, closing a circuit for the pick-up relay 1346. Pick-up relay 1346 energizes and places a local ground on the release trunk conductor 1336 so as to insure the holding of the director until the transmission of the digit is completed; closes at armature 1353 a circuit through armature 1357 and its resting contact and over conductor 1343 for the stepping magnet 1213 of the sequence switch S', which magnet energizes preparatory to advancing the wipers 1211 and 1212; and at armature 1351 it removes the shunt from around the sending contacts 1361 of the sending switch SS.

Accordingly, on each subsequent energization of stepping magnet 1360 of the sequence switch SS, the out-going control circuit is opened at contacts 1361. Since the connection at the intermediate distributing frame IDF, Fig. 15, is such as to predetermine that the first code digit to be transmitted is digit 2, the operation of stepping magnet 1360 continues under the control of the interrupter 1209 until two interruptions have been produced in the out-going control circuit at contacts 1361, the first interruption being produced while wiper 1364 is standing on its first bank contact, which is dead, and the second interruption being produced while the wiper 1364 is standing on its second bank contact, associated with the first impulse stop conductor. Accordingly, when magnet 1360 falls back at the end of the second interruption in the out-going control circuit and advances the wipers 1363 and 1364, wiper 1364 encounters the second impulse stop conductor, which is grounded, thereby closing a circuit for stop relay 1347 as follows: from ground by way of the stop-conductor-distributing wiper 1212 of the sequence switch S', first code-digit stop conductor 1241, wiper 1411 of the office register OR, bank contact 1421, IDF jumper 1431, the second impulse stop conductor, the associated contact in the bank of the sending switch SS, wiper 1364, and stop relay 1347 to battery. Upon energizing, stop relay 1347 shunts the sending contacts 1361 at armature 1354; closes a point in the switch-through circuit at armature 1355, which circuit, however, is maintained open at armature 1350 of the switch-through-control relay 1345; opens the circuit of stepping magnet 1213 of the sequence switch S' and closes a locking circuit for itself at armature 1357, whereupon the wipers 1211 and 1212 of the sequence switch S' advance one step; and at armature 1356 it disconnects magnet 1360 of the switch SS from the start conductor 1341 and connects it instead through the local self-interrupting contacts 1362 to wiper 1363. Acordingly, magnet 1363 operates in a buzzer-like manner to advance the wipers 1363 and 1364 until wiper 1363 encounters the ungrounded contact shown in its bank. When this contact is reached magnet 1360 ceases to operate, and the circuit of the slow acting pick-up relay 1346 is opened. This relay, being slow acting, does not fall back for the time being.

In the first selector repeater, Fig. 8, the impulse relay 729 falls back each time the outgoing control circuit of the director is interrupted as hereinbefore pointed out, and upon each deenergization, closes a circuit at armature 773 and its resting contact through armature 766 and its working contact, armature 779 and its resting contact for vertical magnet 736. Accordingly, vertical magnet 736 operates to raise the wipers 791—793 opposite the second level of bank contacts in response to the two impulses of current which it receives. Upon the closure of off-normal contacts 734, the circuit of stepping relay 727 is completed from ground by way of the grounded conductor 748, working contact and armature 764, armature 786 and its resting contact, and the off-normal contacts 734. Relay 727 thereupon energizes and prepares a circuit for rotary magnet 737 at armature 767, and at armature 768 completes a locking circuit for itself from ground by way of armature 783 and its resting contact, armature 768 and its working contact, interrupter contacts 769 of rotary magnet 737, and hence to battery by way of the off-normal contacts 734 and stepping relay 727.

It will be noted that, whereas relay 726 initially energized through the working contact and armature 773 of the impulse relay 729 and through the normally closed contacts controlled by off-normal springs 735, its circuit is shifted so as to include the armature 773 and its resting contact, and the normally open contacts controlled by off-normal spring 735 when the off-normal springs operate. Accordingly, relay 726 is maintained energized in multiple with the vertical magnet 736 during the vertical operation, and it falls back when the vertical operation ceases.

When relay 726 falls back it completes, at the normally closed contacts controlled by armature 764, a circuit through armature 767 and its working contact for the rotary magnet 737, whereupon rotary magnet 737 pulls up and advances the wipers of the switch into engagement with the first set of bank contacts in the selected level and at the interrupter contacts 769 opens the circuit of stepping relay 727, whereupon relay 727 falls back and opens the circuit of rotary magnet 737 at armature 767. Rotary magnet 737 now falls back and closes its interrupter contacts 769 again.

From this point the operation depends upon whether the trunk line terminating in the first set of bank contacts is busy or idle. Assuming this trunk line to be idle, switching relay 731 energizes right away in series with stepping relay 727. Assuming however on the other hand that this trunk is busy, test wiper 792 encounters ground on the busy test contact with the result that a circuit is completed through armature 785 and its resting contact, interrupter contacts 769, and off normal contacts 734 for stepping relay 727. Accordingly relay 727 energizes again and closes the rotary magnet circuit with the result that another rotary step is taken.

This alternate operation of the stepping relay and the rotary magnet continues until an idle trunk is reached, which trunk it will be assumed is the one comprising conductors 794 and 796. When this idle trunk is reached, stepping relay 727 ceases to operate on account of the fact that test wiper 792 encounters an ungrounded test contact, and switching relay 731, being no longer short circuited, energizes over the following circuit: from ground by way of the grounded release trunk conductor 715, switching relay 731, interrupter contacts 769, off-normal contacts 734, and stepping relay 727 to battery. Relay 727, however, does not pull up over this circuit on account of the relatively high resistance of the switching relay 731. Relay 731, upon energizing, removes ground from armature 768 of stepping relay 727 and closes a locking circuit for relay 729 at armature 783. This locking circuit includes armature 776 and its resting contact and armature 772 and its workng contact. Relay 731 also disconnects conductor 1305 (coming from the director) from the lower winding of impulse relay 773 at the normally closed contacts controlled by armature 784 and extends it by way of the normally closed contacts controlled by armature 775, and wiper 791 to the seized trunk line; opens the test circuit and connects test wiper 792 to the grounded release trunk conductor 715 at armature 785, thereby making the seized trunk busy; prepares at armature 789 a locking circuit for the lower winding of relay 729 for a purpose to be later explained, and at armature 790 grounds wiper 793 through the normally closed contacts controlled by armature 782.

In the reverse-battery repeater, Fig. 9, line relay 803, which is connected to conductors 794 and 796, now energizes from the battery supplied over conductor 794 from the outgoing control conductor of the director, conductor 796 being grounded through wiper 793 of the first selector repeater. Upon energizing, relay 803 closes at armature 809 a circuit for relay 804 and also a circuit in multiple with relay 804 through the normally closed contacts controlled by armature 812 for the upper winding of relay 805. Accordingly relay 805 energizes and opens at armature 817 a point in the circuit of the switch-over relay 801.

Owing to the fact that relay 805 carries only a single armature spring and is furthermore provided with a winding of a lower resistance than the winding of relay 804, the circuit of relay 801 is opened at armature 817 before armature 814 of relay 804 is operated. Upon the energization of relay 804, the upper and lower windings of relay 805 are connected to conductors 818 and 819, and at the normally closed contacts controlled by armature 812 the local energizing ground is disconnected from the upper winding of relay 805, leaving relay 805 energized over conductors 818 and 819, across which there is a bridge at the distant end. As a further result of its energization, relay 804 locks itself to release trunk conductor 795 at armature 813 through the normally closed contacts controlled by armature 807, and at armatures 811 and 816 connects the resting contacts of the operated armatures 809 and 810 to conductors 818 and 819, respectively, preparatory to reversing the direction of current flow in conductors 818 and 819 under the control of the line relay 803.

In the distant incoming selector, Fig. 11, the electro-polarized line relay 1001 whose two windings are normally bridged across the line now energizes over conductors 818 and 819, the bridge being as follows: from conductor 818 through the upper winding of relay 1001, armature 1045 and its resting contact, lower winding of relay 1001, off-normal contacts 1018, and the normally closed contacts controlled by armature 1045 to conductor 819. Due to the combined energization of both its windings relay 1001 pulls up and closes at armature 1031 a circuit for the repeating relay 1002. Relay 1002 operates and closes at armature 1033 a circuit for the slow-acting release relay 1003. Relay 1003 energizes and grounds conductor 1019 at armature 1034 and prepares the switch for operation at armature 1035. As a further result of the energization of repeating relay 1002, it closes at armature 1032 a circuit from ground through the lower winding of relay 1007, normally closed contacts controlled by armature 1049, armature 1032 and its working contact, and relay 1005 to battery. Relay 1005 operates and prepares a locking circuit for the upper winding of relay 1007 at armature 1020. Relay 1007 upon energizing prepares at armature 1046 a locking circuit for relay 1008 and a circuit for subsequently grounding wiper 1057; disconnects the upper talking condenser from the contact to which it is normally connected at armature 1042 and bridges it across the line conductors 818 and 819; and at armature 1043, 1044, closes the locking circuit for its upper winding at armature 1042′ and 1045 closes a local polarizing circuit for the lower winding of relay 1001 and bridges the upper winding of this relay directly across conductors 818 and 819, the upper winding of this relay being bridged across through armature 1045 and its working contact. The local energizing circuit of the polarizing winding of relay 1001 is from ground by way of armature 1044 and its working contact, lower winding of relay 1001 and hence to battery by way of armature 1043 and its working contact and the resistance 1012. The design of the windings of relay 1001 is such that, as before pointed out, the two windings in series across conductors 818 and 819 are sufficient to operatively energize the relay, and it is such that when current is flowing in the upper winding in the same direction as the current flowing in the local circuit through the lower winding the relay is operated, and such that when the current flow is reversed in the upper winding the armature of the relay is immediately retracted.

Returning now to the director, it will be noted that the contacts 1422—1424 in the bank of the office register OR, now engaged by the wipers 1412—1414, are connected by means of the jumpers 1432—1434, respectively, to the skip conductor 1401. This is done on account of the fact that there is only one digit in the code of the office now being called. Accordingly, when wipers 1211 and 1212 of the sequence switch S′ are advanced into engagement with the second set of associated contacts, as above pointed out, the ground potential placed by wiper 1212 on wiper 1412 of the office register OR is extended to the skip conductor 1401 and it is further extended through the local interrupter contacts 1214 to the stepping magnet 1213 of the sequence switch S′. Accordingly, stepping magnet 1213 operates in a buzzer-like manner and advances the wipers 1211 and 1212 over the second, third, and fourth sets of contacts and into engagement with the fifth set of bank contacts, in which position the first subscriber digit is to be transmitted.

After the interval for which it is adjusted, the slow acting pick-up relay 1346, Fig. 14, falls back and opens the locking circuit of the stop relay 1347, which relay also is slow acting and it holds up for an interval after which it falls back and at armature 1356 connects up the stepping magnet 1360 to the start conductor 1341 to transmit the first subscriber digit, which is registered on the digit register DR—1. Accordingly the wipers of the switch SS are advanced to their pick-up position, whereupon pick-up relay 1346 again operates to remove the shunt from around the sending contacts 1361 at armature 1351 and, as the wipers are further advanced, the interruptions are produced at the sending contacts in the outgoing control circuit. This operation continues until stop wiper 1361 encounters the bank contact associated with the impulse stop conductor on which wiper 1251 of the digit register DR—1 is standing, at which time the sending of the impulses is stopped in the hereinbefore described manner and the wipers of the sequence switch S′ are again advanced.

In a similar manner the second, third, and fourth subscriber digits are transmitted in accordance with the setting of the register DR—1—DR—4, respectively, the wipers of the sequence switch S′ being advanced one step at the end of the transmission of each of the digits. Accordingly, the wiper 1212 arrives on the last bank contact at the end of the transmission of the last subscriber digit with results to be pointed out hereinafter.

When the second series of interruptions is produced in the outgoing control circuit of the director, line relay 803 of the reverse battery repeater, Fig. 8, falls back a corresponding number of times. Each time it does so, it reverses the direction of current flow in conductors 818 and 819 by placing battery directly on conductor 819 at armature 810 and by placing ground directly on conductor 818 at armature 809. When this reversal of current flow takes place, the reversal of current through the upper winding of the electro-polarized relay 1001 of the incoming selector repeater, Fig. 11, results in a retraction of the armature 1031 of relay 1001. Accordingly, repeating relay 1002 falls back a number of times corresponding to the original number of interruptions produced in the outgoing control circuit of the director. Each time it falls back, relay 1002 closes at armature 1033 a circuit through armature 1035 and its working contact and armature 1053 and its resting contact for the vertical magnet 1015. The vertical magnet 1015 responds to raise the wipers 1055—1057 step by step until they stand opposite the corresponding level of bank contacts. The slow acting relay 1004 energizes when the first impulse of current is delivered to vertical magnet 1015 and it maintains its energization throughout the vertical movement. At armature 1037 relay 1004 prepares a circuit for the stepping relay 1008 which is completed at off-normal contacts 1017. Relay 1008 thereupon energizes and prepares a circuit for rotary magnet 1016 at armature 1048, and at armature 1047 closes a locking circuit for itself which extends from ground by way of the working contact and armature 1046, armature 1054 and its resting contact, working contact and armature 1047, interrupter contacts 1050, off-normal contacts 1017 and relay 1008 to battery.

It will be noted that the circuit through relay 1005 and through the lower winding of the change-over relay 1007 is opened at armature 1032 of line relay 1002 upon each deenergization of the latter relay. This does not result in a deenergization of relay 1007 on account of the fact that a new locking circuit for the upper winding of relay 1007 is completed by relay 1004 before relay 1007 has time to fall back, responsive to the opening of its initial locking circuit at armature 1020 when relay 1005 falls back. The new locking circuit is from ground by way of working contact and armature 1034, normally open contacts controlled by armature 1037, armature 1042 and its working contact and the upper winding of relay 1007 to battery. The initial circuit of relays 1005 and 1007 is of course reestablished each time the repeating relay 1002 pulls up with the result that the initial circuit is intact at the end of the vertical movement, and the initial locking circuit for relay 1007 is reestablished at armature 1020.

At the end of the vertical movement, relay 1004 falls back and at the normally closed contacts controlled by armature 1037 completes through the working contact and armature 1048 the circuit of rotary magnet 1016. Accordingly the rotary magnet 1016 operates to advance the wipers into engagement with the first set of bank contacts in the selected level. The action of the stepping relay 1008 and rotary magnet 1016 is the same as that described in the connection with the first selector repeater, Fig. 8. Assuming that the trunk line comprising conductors 158 and 161 is the first one found to be idle, the wipers 1055—1057 are stopped in engagement with the bank contacts of this trunk line, whereupon switching relay 1009 operates from the grounded conductor 819 in series with interrupter contacts 1050, off-normal contacts 1017, and the stepping relay 1008; opens the test circuit and grounds the test wiper 1056 at armature 1051; disconnects the stepping relay 1008 from armature 1037 of relay 1004 at armature 1052; cuts off the vertical magnet 1015 at armature 1053; disconnects ground from the working contact of armature 1047 and extends it to wiper 1057 at armature 1054; and at armature 1049 connects relay 1005 through the working contact and armature 1032 to the wiper 1055 and disconnects it from the lower winding of relay 1007. When the transfer is made, relay 1005 remains energized over conductor 158 and through the bridge across conductors 158 and 161 at the intermediate selector, Fig. 3, and to ground through wiper 1057, working contact and armature 1054, and armature 1046 and its working contact. Accordingly, relay 1005 maintains the locking circuit of the upper winding of relay 1007 closed at armature 1020.

In the intermediate selector, Fig. 3, relay 201, which is bridged across conductors 158 and 161 through the normally closed contacts controlled by armatures 214 and 219, energizes in series with the relay 1005 of the incoming selector repeater, Fig. 11, and closes at armature 206 a circuit from the grounded release trunk conductor 159 through the resting contact and armature 216, and armature 206 and its working contact for the combined release and change-over relay 203 in series with the resistance 202. Relay 203 now energizes and closes a locking circuit for itself at armature 209, at the same time preparing at armature 210 a circuit for stepping relay 204 and preparing a circuit for vertical magnet 223 at armature 211.

When the director transmits the next digit in the number, in this case the digit 3, the electro-polarized relay 1001 of the incoming selector repeater, Fig. 11, responds as before and opens the circuit of relay 1002 three times. Each time its circuit is opened, relay 1002 falls back and closes at armature 1033 a circuit through armature 1045 and its working contact for relay 1004. Relay 1004 accordingly energizes and maintains its energization throughout the series of impulses. At armature 1037 relay 1004 closes a circuit from the grounded conductor 1019 through the normally open contacts controlled by armature 1037 to battery through armature 1042 and its working contact and the upper winding of relay 1007, thereby maintaining the locking circuit of the upper winding of relay 1007 intact during the series of deenergizations of relay 1005 due to the repeating of the impulses at armature 1032 of relay 1002.

In the intermediate selector, Fig. 3, line relay 201 falls back each time its circuit is opened at armature 1032 of relay 1002 of the incoming selector repeater, Fig. 11. Each time it falls back line relay 201 opens the initial circuit of relay 203 at armature 206, leaving relay 203 locked up through its own armature 209 and its working contact. As a further result of each of its deenergizations, relay 201 closes at armature 207 a circuit through armature 211 and its working contact for vertical magnet 223. By the operation of vertical magnet 223, the wipers 241—244 are raised step-by-step until they come to rest opposite the third level of bank contacts. As soon as the off-normal springs 225 close upon the first vertical step of the switch, a circuit is closed from ground by way of the contacts 220 of the release magnet 221, working contact and armature 210, off-normal contacts 225, and stepping relay 204 to battery. Relay 204 thereupon energizes and prepares the rotary magnet circuit at armature 212 and closes a locking circuit for itself at armature 213 through interrupter contacts 226.

As a result of the closure of the off-normal contacts 208, relay 203 is shunted upon each deenergization of relay 201 by the ground potential applied to the junction of its winding and the resistance 202 through armature 217 and its resting contact, armature 207 and its working contact, and the off-normal contacts 208. Owing to the fact, however, that a short circuited relay is slow acting, this relay does not fall back during the vertical movement. When relay 201 comes to rest in an energized condition, relay 203 falls back and completes the rotary magnet circuit at the normally closed contacts controlled by armature 210. When this occurs rotary magnet 224 pulls up and advances the wipers 241–244 into engagement with the first set of bank contacts in the third level, at the same time opening the circuit of relay 204 at the interrupter contacts 226. The result is that relay 204 falls back and opens the circuit of rotary magnet 224, which falls back and closes the interrupter contacts 226 again. The further action of this selector in selecting an idle trunk is the same as is hereinbefore described in connection with the other selectors. Assuming that the trunk selected is the one comprising conductors 245–248, relay 205 pulls up when this trunk is reached and switches the connection through to the selected trunk line, cutting off the line relay 201 at the normally closed contacts controlled by armature 214 and 219, disconnecting relay 203 at armature 216, opening a point in the circuit of release magnet 221 at armature 217, and extending the grounded release trunk conductor 159 through the working contact and armature 215 to its test wiper 242, thereby making the seized trunk busy.

In the connector, Fig. 4, line relay 302, which is bridged across conductors 245 and 248 through the resting contact and armature 341, through off-normal contacts 361, and the normally closed contacts controlled by armature 357, pulls up and opens a point in the operating circuit at armature 324 and closes a point in the circuit of relay 301 at armature 325.

As result of the ground potential being placed on test wiper 242 of the intermediate selector, Fig. 3, a ground potential appears on the release trunk conductor 246 and is extended through the off-normal contacts 362 to relay 303. Relay 303 energizes and prepares a locking circuit for itself at armature 328; shifts the operating conductor 358 from the rotary magnet 308 to the vertical magnet 309; and at armature 329 completes the circuit of relay 301 from the grounded release trunk conductor 246, through armature 325 of line relay 302 and its working contact to battery through the release relay 301. Relay 301 energizes and prepares the operating circuit at armature 321; locks itself to conductor 359 and disconnects the said conductor 359 from the release magnet circuit at armature 323; and at armature 322 it connects release trunk conductor 246 to the conductor 359 and disconnect the latter from ground locally so as to permit relay 301 to become deenergized when the ground is removed from conductor 246 in case the call is abandoned before it is completed. As a further result of its energization, relay 301 shunts the off normal contacts 361 (in the circuit of line relay 301) at armature 357.

When the next digit 2 is transmitted by the director, the interruptions produced in the outgoing control circuit of the director are repeated in the hereinbefore described manner with the result that relay 302 of the connector, Fig. 4, falls back twice. Each time it falls back, relay 302 completes the operating circuit at armature 324, thereby operating the vertical magnet 309 through armature 327 and its working contact. Accordingly, magnet 309 operates to raise the wipers 347—349 two steps. Relay 305 is operated from the operating conductor 358 and it maintains its energization throughout the vertical movement. At armature 335 relay 305 completes the locking circuit through armature 328 and its working contact for relay 303, thereby maintaining relay 303 operated after its initial circuit is opened at off normal contacts 362.

At the end of the vertical movement, relay 305 falls back and opens at armature 335 the locking circuit of relay 303 with the result that relay 303 falls back and shifts the operating conductor 358 from the vertical magnet 309 to the rotary magnet 308.

When the next and last digit is transmitted by the director relay 302 is deenergized a corresponding number of times as before, and on each deenergization, grounds the operating conductor 358 which is now connected at armature 321 and its resting contact to rotary magnet 308. Accordingly the rotary magnet operates to advance the wipers 347—349 step-by-step until they come into engagement with the bank contacts 350—352 of the line of the substation A'. Relay 305 is again energized from the operating conductor 358. At armature 334 relay 305 disconnects the test wiper 348 from the upper winding of relay 307 and connects it instead to the busy relay 306, and at armature 336 places a shunt around armature 339 and its resting contact so as to prevent a premature opening of the circuit of release relay 301 in case busy relay 306 energizes during the rotary movement due to test wiper 348 encountering busy test contacts.

Referring now again to the director, although an arrangement to be later described is provided in the director for freeing the director responsive to the switch-over operation in the switch train, this arrangement does not come into play except on numbers containing less than the maximum number of digits. Accordingly, since the number of the subscriber at substation A' contains the maximum number of digits for which the director is adapted in the present case, the switch-through operation of the director is controlled locally in this case as will now be explained.

Returning now to the point at which the sequence switch S' advances its wipers at the end of the transmission of the last digit, it will be remembered that these wipers advance into engagement with the last associated set of bank contacts. Accordingly, the grounded wiper 1212 places ground on the operating and switching conductor 1335. When this occurs, a circuit is closed over conductor 1335 through bank contact 1332, wiper 1329, working contact and armature 1334, conductor 1302, resting contact and armature 788, resting contact and armature 777, armature 755 and its working contact, normally closed contacts controlled by armature 778, and the switch-over relay 730 to battery. Relay 730 energizes over this circuit and locks itself at armature 778 to the grounded release trunk conductor 715, at the same time opening its initial circuit; disconnects ground by way of the grounded conductor 748 from conductor 1304 at armature 780; and at armature 781 disconnects the release conductor 1303 of the director selector from the local release circuit of the first selector repeater and connects it to ground. Accordingly, relay 1313 of the director selector falls back responsive to the removal of the ground potential from conductor 1304, and completes at armature 1327 a circuit through the off-normal contacts 1316 for the release magnet 1318 from the grounded release conductor 1303. The result is that release magnet 1318 energizes and the wipers 1329—1331 are restored to their normal position in the usual manner.

As a further result of its energization, switch-over relay 730 of the first selector repeater disconnects the local operating conductor from the operating conductor 1302 leading to the director selector at armature 788; disconnects vertical magnet 736 and prepares a circuit for operating relay 726 at armature 779; disconnects armature 755 of line relay 722 at armature 777 from the local operating circuit and connects it instead to relay 724; and at armatures 775, 776 and 782 disconnects ground from the upper talking conductor and switches the upper and lower talking conductors through to the wipers 791 and 793, at the same time disconnecting the outgoing control circuit of the director from wiper 791 and disconnecting ground from wiper 793. Owing to the fact that the line relay of the reverse battery repeater, Fig. 9, is bridged across the trunk conductors 794 and 796, relay 729 remains locked up after its initial locking circuit is broken at armature 779. The new locking circuit of relay 729 is as follows: From ground through the lower winding of relay 729, working contact and armature 789, working contact and armature 774, resting contact and armature 754, armature 782 and its working contact, working contact and armature 790, wiper 793, the line relay bridged across conductors 796 and 795, wiper 791, working contact and armature 775, armature 751 and its resting contact, armature 772 and its working contact, and the upper winding of relay 729 to battery. Relay 729 is arranged to lock up over the above circuit so as to prevent the usual battery feed relays 724 and 725 from being connected up prior to the regular switch-over operation in the switch train to disconnect the various line relays, as the battery feed relays 724 and 725 would energize prematurely if they were connected up at this time, and relay 724 would operate prematurely the meter on the calling line in a manner to be hereinafter explained.

In the director, release relay 1344 falls back when the ground potential is removed from release trunk conductor 1336. The ground potential originally applied to conductor 1336 through wiper 1330 of the director selector is first removed, but the local ground potential applied at armature 1352 of pick-up relay 1346 is not removed until relay 1346 falls back responsive to the restoration to normal of the sending switch SS following the transmission of the last digit. Upon deenergizing, relay 1344 grounds the release conductors 1342 and 1358 at armatures 1348 and 1349, respectively. Upon the grounding of release conductor 1542, a circuit is closed through the last contact in the bank of the restoring wiper 1211 of the sequence switch S′ and the local self interrupting contacts 1214 for stepping magnet 1212 of the sequence switch S′. Accordingly, the magnet 1213 operates to advance the wipers 1211 and 1212 the remaining step to their normal position.

As a result of the placing of the ground potential on the release conductor 1358, the sequence switch S, Fig. 13, the office register OR, Fig. 15, and the digit registers DR—1–DR—4, Fig. 16, are all restored to their normal position in the usual manner. For example, release magnet 1404 of the office register OR operates under the control of off-normal contacts 1405 to restore the office register OR, and the release magnet 1502 of the digit register DR—1 operates under the control of off-normal contacts 1503 to restore the wiper of the digit register DR—1 to normal.

The director is now restored to normal and is ready to be used in the handling of another call.

Returning now to the connector, Fig. 4, the operation which takes place at the end of the rotary movement is dependent upon whether the called line is busy or idle. Assuming first that the called line is busy, busy relay 306 is energized when the wipers of the connector come to rest on the bank contacts of the called line. In this case, when relay 305 falls back it completes at the normally closed contacts controlled by armature 334 a locking circuit for busy relay 306 from the grounded release trunk conductor 246, through armature 337 and its working contact, and the normally closed contacts controlled by armature 334. Busy relay 306 remains energized with the result that the common busy signalling conductor 501 remains connected at armature 346 to the associated portion of the talking circuit preparatory to giving a busy signal to the calling subscriber.

As a result of the opening of the circuit of relay 301, this relay falls back and opens a further point in its own locking circuit and prepares a circuit for release magnet 310 at armature 323; removes ground from armature 324 of line relay 302 at armature 321 so as to prevent a closure of the operating circuit when line relay 302 falls back; at armature 322 disconnects release trunk conductor 246 from conductor 359 and connects the latter to ground preparatory to closing the release magnet circuit; and at armature 357 disconnects relay 302 from in bridge of conductors 245 and 248 (the off-normal contacts 361 having been operated) and connects conductor 248 through to armature 346, thereby completing the busy signalling circuit from the common busy signalling conductor 501.

In the incoming selector repeater, Fig. 11, the battery feed relay 1005 falls back responsive to the disconnection of the line relay of the connector from in bridge of the talking conductors and opens the locking circuit of the switch-over relay 1007 at armature 1020. Switch-over relay 1007 now falls back and joins the two associated sections of the talking circuit at armatures 1042 and 1046, at the same time disconnecting ground from wiper 1057 at armature 1046, thereby removing the shunt from around the ground-battery feed relay 1006; opens a further point in its own locking circuit at armature 1042′ so that it will not again pick up when relay 1005 again pulls up; and at armatures 1043, 1044, and 1045 disconnects the local battery and ground connections from the lower winding of relay 1001 and reinserts this winding in the bridge across conductors 818 and 819 including the upper winding of the relay. The bridge across conductors 818 and 819 at this time is through the upper winding of relay 1001, armature 1045 and its resting contact, lower winding of relay 1001, resistance 1010 (off-normal contacts 1018 being now operated), and the normally closed contacts controlled by armature 1045. The resistance element 1010, it may be pointed out is of fairly high resistance.

In the reverse battery repeater, Fig. 9, relay 805 now falls back owing to the inclusion of the resistance 1010 in the bridge across conductors 818, Fig. 11, and it closes at armature 817 a circuit through armature 814 and its working contact for the switch-over relay 801. Relay 801 thereupon energizes and closes at armature 807 a locking circuit for itself to the grounded release trunk conductor 795, at the same time opening the locking circuit of relay 804, leaving relay 804 energized through armature 809 and its working contact. As a further result of its energization relay 801 disconnects conductors 794 and 796 from line relay 703 and connects them through to conductors 818 and 819, at the same time disconnecting conductors 818 and 819 from relay 805. Relay 803 now falls back and opens at armature 809 the circuit of relay 804, whereupon relay 804 falls back.

In the first selector repeater, Fig. 8, relay 729, which is now acting in its capacity as a guard relay falls back owing to the high resistance of the bridge at the incoming selector repeater, Fig. 11, and opens at armatures 772 and 774 its own locking circuit, at the same time connecting the battery feed relays 724 and 725 to the talking circuit at the resting contacts and armatures 772 and 774, relay 725 being connected to the talking circuit through the resting contact and armature 774, and relay 724 being connected to the talking circuit through the working contact and armature 777, armature 755 and its working contact and the resting contact and armature 772. Relays 724 and 725 do not operate at this time owing to the high resistance 1010 in the bridge across conductors 818 and 819, Fig. 11.

As one of the characteristics of the system to which the present invention is applied is that the placing of battery on the positive talking conductors holds up the entire connection when, for example, the battery is placed on at a manual switchboard, and that the placing of battery and ground alternately on the positive talking conductor flashes the supervisory lamp at a calling operator's switchboard, the connection of the common busy signalling lead 501 to the positive talking conductor at armature 346 of busy relay 306 of the connector, Fig. 4, has other effects in the switch train besides transmitting the usual busy tone back to the calling subscriber. These other effects are of course incidental at this time, as there is no operator involved in the connection, but they will be described in order that the circuits may be thoroughly understood.

When battery is placed on the common busy signalling conductor 501 by the slow operating interrupter associated with the common busy machine, Fig. 6, this battery potential is transmitted back over the positive talking conductor of the established connection to wiper 1057 of the incoming selector repeater, Fig. 11, and thence through the working contact and armature 1054 to the relay 1006 whose upper terminal is connected to ground. Accordingly, relay 1006 energizes and prepares at armature 1040 a circuit for holding the release relay 1003 operated (of no use at present) and at armature 1039 it places battery through the resistance 1011, armature 1036 and its resting contact armature 1039 and its working contact, and the normally closed contacts controlled by armature 1042 on the positive talking conductor 819. This results in a battery potential being extended back to the positive wiper 793 of the first selector repeater, Fig. 8, and from thence through armature 790 and its working contact, working contact and armature 782, armature 754 and its resting contact, and armature 774 and its resting contact to the relay 725, whose upper terminal is grounded. Relay 725, accordingly, pulls up and completes at armature 763 a holding circuit for release 723 which includes the working contact and armature 770, and the resting contact and armature 760.

When the battery is subsequently removed from the common busy signaling conductor 501, the above mentioned relays fall back and restore the circuits to the condition existing prior to the placing of battery on conductor 501.

When the calling subscriber hears the busy tone, he replaces his receiver with the result that the operated switches are released in a manner to be pointed out more fully hereinafter, it being understood of course that the interval of time elapsing between the successive applications of battery potential to the common busy signalling conductor 501 by the slow interrupter associated with the busy machine, Fig. 6, is long enough to permit the various slow acting release relays concerned to fall back when the calling subscriber replaces his receiver.

Returning now to the connector, Fig. 4, it will now be assumed that the line of substation A' is idle when called as hereinbefore described. In this case it will be understood that the director goes through its operation and switches through and that the operations resulting therefrom are the same in this case as before. In the connector however, the operation is different as will be now pointed out. When the wipers of the connector come to rest in this case on the bank contacts of the called line, no ground potential is encountered by test wiper 348, and busy relay 306 fails to energize. Accordingly, when the slow acting relay 305 falls back upon the termination of the rotary movement, it completes at armature 354 a circuit for the test winding of relay 307 as follows: from ground by way of the grounded release trunk conductor 246, armature 337 and its resting contact of busy relay 306, test winding of relay 307, resting contact and armature 334, test wiper 348, bank contact 351, relay 353, and magnet 355 to battery. Relays 307 and 353 energize in series over the above circuit, but relay 353 energizes only about half way on account of the usual mechanical interlocking device (not shown) between its armature proper and that of the associated line relay 354. Accordingly, relay 353 disconnects the line relay 354 and the ground from the conductors of the line of substation A, but it does not connect up the associated wipers.

In the connector, switching relay 307, upon energizing, closes at armature 343 a locking circuit for itself to the grounded release conductor 246; unlocks relay 301 at armature 344 and closes a circuit for relay 303; connects the grounded release trunk conductor 246 directly with wiper 348 at armature 342 so as to supply a ground potential to wiper 348 independent of the test winding of relay 307; disconnects line relay 302 from in bridge of the conductors 245 and 248 at armature 341; and at armatures 340 and 345 it connects up the wipers 347 and 349, thereby completing the ringing circuit which extends from the common ringing lead through the upper winding of ring cut-off relay 304 to the negative talking conductor and thence over the associated line conductor to the bridged bell at the substation A' and returns over the positive talking conductor to ground through wiper 349 at armature 333 and its resting contact. Accordingly, the bridged bell at the called substation is intermittently operated, as the ringing current is intermittently applied to the common ringing lead.

Regarding the operations produced by the alterations in the circuit of relays 301—303, relays 301 and 302 fall back together and restore the associated circuits to normal. Relay 303 pulls up responsive to the closure of its circuit at armature 344 and its working contact and closes at the working contact and armature 326 a connection through the small auxiliary condenser between wiper 347 and conductor 245 so as to permit a small amount of ringing current to pass back to the calling line to inform the calling subscriber that the called subscriber is being signalled.

It will be understood of course that the switchover operation hereinbefore described takes place responsive to the disconnection of line relay 302. Accordingly, the reverse battery repeater, Fig. 9, is switched through and the battery feed relays 1005 and 1006 of the incoming selector repeater, Fig. 11, as well as the battery feed relays 724 and 725 of the first selector repeater, Fig. 8, are connected up.

When the subscriber at substation A' responds to the ringing of his bell by removing his receiver, a direct current bridge is closed across the conductors of his line, whereupon the ring-cut-off relay 304 of the connector responds; closes a locking circuit for its lower winding at armature 372; and at armatures 331 and 333 disconnects the line wipers from its own upper winding and ground extends them to the conductors 245 and 248.

In the incoming selector repeater, Fig. 11, relays 1005 and 1006 now energize in series over the called line and at armatures 1038 and 1041 shunt the resistance 1010 (in the bridge across conductors 818 and 819). When this occurs the battery feed relays 724 and 725 of the first selector repeater, Fig. 8, operate, and relay 724 closes a circuit for relay 726 as follows: from ground by way of the grounded conductor 748, resistance 747, working contact and armature 779, working contact and armature 761, off-normal spring 735 and its associated contact, and relay 726 to battery. Relay 726 energizes and locks itself by shunting armature 761 and its working contact at armature 766, and at armature 764 completes a circuit from the grounded conductor 748 through the working contact and armature 764, armature 786 and its working contact, conductor 716, contact in the bank of wiper 712 and said wiper, working contact and armature 708, and the magnet of the meter M to battery. Accordingly the magnet of the meter M energizes and operates the associated number wheels to register the call.

The calling and called subscribers may now converse with each other in the usual manner.

When the conversation is completed, assuming that the subscriber at substation A' replaces his receiver first, the battery feed relays 1005 and 1006 of the incoming selector repeater, Fig. 11, fall back when the receiver is replaced at the called substation and remove the shunt from around resistance 1010 at armatures 1038 and 1041, and at armatures 1020 and 1040 open the alternate holding circuit of release relay 1003, leaving this relay energized at armature 1033 of relay 1002.

In the first selector repeater, Fig. 8, relays 724 and 725 fall back responsive to the increase in the resistance in the bridge across talking circuit at the incoming selector repeaters and relay 724 opens the initial circuit of relay 726, leaving this relay energized over its locking circuit through armature 766.

When the calling subscriber replaces his receiver, line relay 722 of the first selector repeater falls back and opens the battery feed bridge at armature 755, and at armature 757 opens the circuit of release relay 723, which relay falls back shortly thereafter and removes ground from the release trunk conductor 715 at armature 757, whereupon the calling line is rendered idle in the banks of the connector switches having access to it, and switching relay 703 falls back. As a further result of the deenergization of relay 723, ground is removed from conductor 748 at armature 758 to permit relays 726 and 730 to fall back. The circuit of release magnet 732 is completed at armature 759, through the off-normal contacts 733. Accordingly, the switch is restored to its normal position in the usual manner.

In the incoming selector repeater, Fig. 11, relay 1001 falls back responsive to the opening of the battery feed bridge at armature 755 of relay 722 of the first selector repeater, Fig. 8, and opens the circuit of relay 1002 at armature 1031. Relay 1002 falls back and opens the bridge across wipers 1055 and 1057 at armature 1032, and at armature 1033 opens the circuit of release relay 1003 and closes through armature 1035 and its working contact a circuit for relay 1004. The closure of this circuit and the resulting energization of relay 1004 are merely incidental at this time. At the end of the interval for which it is adjusted, release relay 1003 falls back and removes ground at armature 1034 from conductor 1019 which is the conductor which supplies the ground potential through test wiper 1056 to hold up the intermediate selector of Fig. 3 and the connector of Fig. 4. Accordingly, switching relay 205 of the intermediate selector and relays 304 and 307 of the connector fall back. Release relay 1003 also completes the release magnet circuit at armature 1035 through off-normal contacts 1014 with the result that the incoming selector repeater is released in the usual manner.

The deenergization of relay 205 of the intermediate selector results in the closure at armature 217 of a circuit for the release magnet 221 through armatures 207 and 211 and the contacts 222. The switch is thereupon released to its normal position in the usual manner.

In the connection, Fig. 4, relay 307, on falling back, opens at armature 344 the circuit of relay 303 and closes a circuit through the resting contact and armature 339, armature 323 and its resting contact, and the off-normal contacts 311 for the release magnet 310, with the result that the connector switch is restored to its normal position in the usual manner.

The entire connection is now released and the apparatus involved therein may be used in setting up another connection.

*Call to the toll recording operator*

It will now be assumed that the subscriber at substation A, desiring to establish a long distance connection, calls the toll recording operator to ask for the connection. Assuming that when the subscriber at substation A removes his receiver the first selector repeater shown in Fig. 8, is the one selected, and that when the calling subscriber dials the first digit in the designation of the toll recording operator the director shown in Figs. 13–16 is the first one found to be idle by the director selector, Fig. 14, the release relay 1344 of the director, Fig. 14 is energized in the usual manner responsive to the seizure of the director, and removes ground from the associated release conductors. Assuming further that the designation of the toll recording operator comprises two more digits and that these digits are such that the wipers of the office register OR, Fig. 15, are brought into engagement with the bank contacts 1441—1444 responsive to the dialling of these two digits, it will be seen that, since the first bank contact 1441 is the only one connected up on the intermediate distributing frame IDF, only a single digit will be transmitted by the director. This is due to the fact that the toll recording operator's switch board is reached directly from the first selector repeater, Fig. 8. It will be seen further that, since the jumper 1445 on the intermediate distributing frame connects the first bank contact 1441 with the third impulse stop conductor, the digit to be transmitted in this case is the digit 3. When the sending apparatus is started in the manner hereinbefore described, the digit 3 is sent out, resulting in three interruptions being produced in the circuit of the impulse relay 729 of the first selector repeater, Fig. 8, by the director in the hereinbefore pointed out manner. The first selector repeater raises its wipers opposite the third level of bank contacts and searches for and selects an idle trunk. Assuming that the trunk comprising conductors 797—799 is the first one found to be idle, this trunk is the one seized upon the energization of the switching relay 731. When this idle trunk is seized, the control conductor 1305 is disconnected at armature 784 of the switching relay 731 from the lower winding of impulse relay 729 and is connected instead to wiper 791. Accordingly the battery potential on the control conductor and the ground potential on the positive wiper 793 through armature 790 and its working contact results in the operation over conductors 797 and 799 and through armatures 620 and 623, Fig. 7, and their resting contacts of the line relay 605 of the toll recording trunk circuit. Relay 605, upon energizing, connects relay 604 at armature 619 to the grounded release trunk conductor 798. Conductor 798 is grounded through its connection to release trunk conductor 715 of the first selector repeater, which, as hereinbefore pointed out, is grounded at the first selector repeater through the lower winding of the switch-through relay 721. Relay 604 energizes when it is connected to release trunk conductor 798 and connects release trunk conductor 798 to ground locally through the upper winding of relay 606. Therefore, part of the current for maintaining relay 604 energized flows through the upper winding of relay 606. Relay 606, however, being marginally adjusted, is not operated at this time owing to the fact that it is shunted by the low resistance lower winding of relay 721, Fig. 8.

In the first selector repeater, relay 721 energizes responsive to the connection of the low resistance relay 604, Fig. 7, to the release trunk conductor and closes a locking circuit for itself at armature 752 to the grounded conductor 715, which locking circuit, therefore, includes its two windings in series; disconnects ground from armature 756 of line relay 722 at armature 753, thereby opening the circuit of release relay 722; at armature 755 and its working contact closes a circuit for the switchover relay 730; and at armatures 751 and 754 disconnects conductors 714 and 717 from the line relay 722 and extends them through to armatures 775 and 782 of the switch-over relay 730, at the same time cutting off the line relay 722 and also the portions of the talking circuit to which the battery feed relays 724 and 725 are subsequently attached. As a result of the closure at armature 753 of the circuit through the normally closed contacts controlled by armature 778 for relay 730, this relay pulls up and completes its locking circuit at armature 778, at the same time completing the switching through of the connection at armatures 775 and 782, in addition to bringing about the release of the director in the hereinbefore pointed out manner.

In the toll recording trunk circuit, Fig. 7, the line relay 605, being slow acting, remains operated and maintains in the low wound relay 604 connected to the release trunk conductor 798 at armature 619 for an interval following the above described switch-through operation in the first selector repeater, Fig. 8, to give time for the slow acting release relay 723 to fall back responsive to the opening of its circuit at armature 753.

When release relay 723 falls back, it disconnects the lower winding of relay 721 from release trunk conductor 715, thereby removing the lower winding of this relay from in shunt of the upper winding of relay 606 of the toll recording trunk circuit, Fig. 7. Relay 606 energizes responsive to this operation and completes at armature 622 a locking circuit for itself to the grounded conductor 625 which is grounded at armature 618 of relay 604; places direct ground on the release trunk conductor 798 at armature 621; and at armatures 620 and 623 disconnects conductors 797 and 799 from the line relay 605 and extends them through the resting contacts and armatures 607 and 610 to the windings of the double-wound line relay 602. Relay 602 now energizes over the calling line and grounds at armature 612 the local locking conductor 625 before this conductor has been ungrounded at armature 618 due to the falling back of relay 604, occasioned by the falling back of the slow acting relay 605. As a further result of the energization of the battery feed relay 602, the circuit of the line lamp L′ is completed at armature 611, and at armature 613 the common ringing lead is connected through the small condenser 624 and armature 616 and its resting contact to conductor 799, thereby simulating the ring-back tone which is placed on the connection in an ordinary subscriber to subscriber call to inform the calling subscriber that the called subscriber is being signaled. When the toll recording operator notes the lighted condition of the lamp L′, she inserts the plug of an idle cord circuit into the jack J′, thereby energizing relay 601. At armatures 607 and 610, relay 601 cuts off relay 602; it grounds conductor 625 at armature 609; and at armature 608 it closes a circuit for the slow acting relay 603, which relay energizes and locks itself to conductor 625 at armature 615 and cuts off the lamp L' and the ring-back tone at armatures 614 and 616, respectively.

The operator may now throw the usual listening key associated with her cord circuit and converse with the calling subscriber in the usual manner.

When the conversation is completed the operator withdraws the plug from the jack J' and the calling subscriber replaces his receiver. The results accompanying these actions depend somewhat upon whether or not the two occur at the same time, and if not, upon which of the two occurs first. Assuming first that the calling subscriber hangs up his receiver before the operator withdraws the plug, the usual supervisory lamp is operated in the operators cord circuit to inform her that the calling subscriber has hung up, and, when the operator pulls the plug from the jack J', line relay 602 is again connected up at armatures 607 and 710 of the sleeve relay 601, but the line relay 602 does not again pull up on account of the fact that the calling subscriber has replaced his receiver. Accordingly, the removal of the ground potential from conductor 625 at armature 609 of the sleeve relay 601 results in the deenergization of the slow acting relays 603 and 606, and when relay 606 falls back it removes ground from conductor 798 at armature 621 with the result that relays 721, 730, and 731 of the first selector repeater and relay 703 of the line switch LS fall back. The first selector repeater releases in the hereinbefore described manner.

Assuming on the other hand that the operator removes the plug from the jack J' before the calling subscriber replaces his receiver, relay 601 connects up line relay 602, and line relay 602 energizes again over the calling line and replaces ground on conductor 625 at armature 612 to maintain relays 603 and 606 locked up. Accordingly, the connection is held up and relay 603 prevents the lamp L' from becoming lighted again and prevents the ring-back tone from being again placed on the calling line. It is obvious that when the subscriber replaces his receiver relay 602 falls back and removes ground from the conductor 625 whereupon the connection is released as before.

*Toll connection to substation A'*

Figure 1:
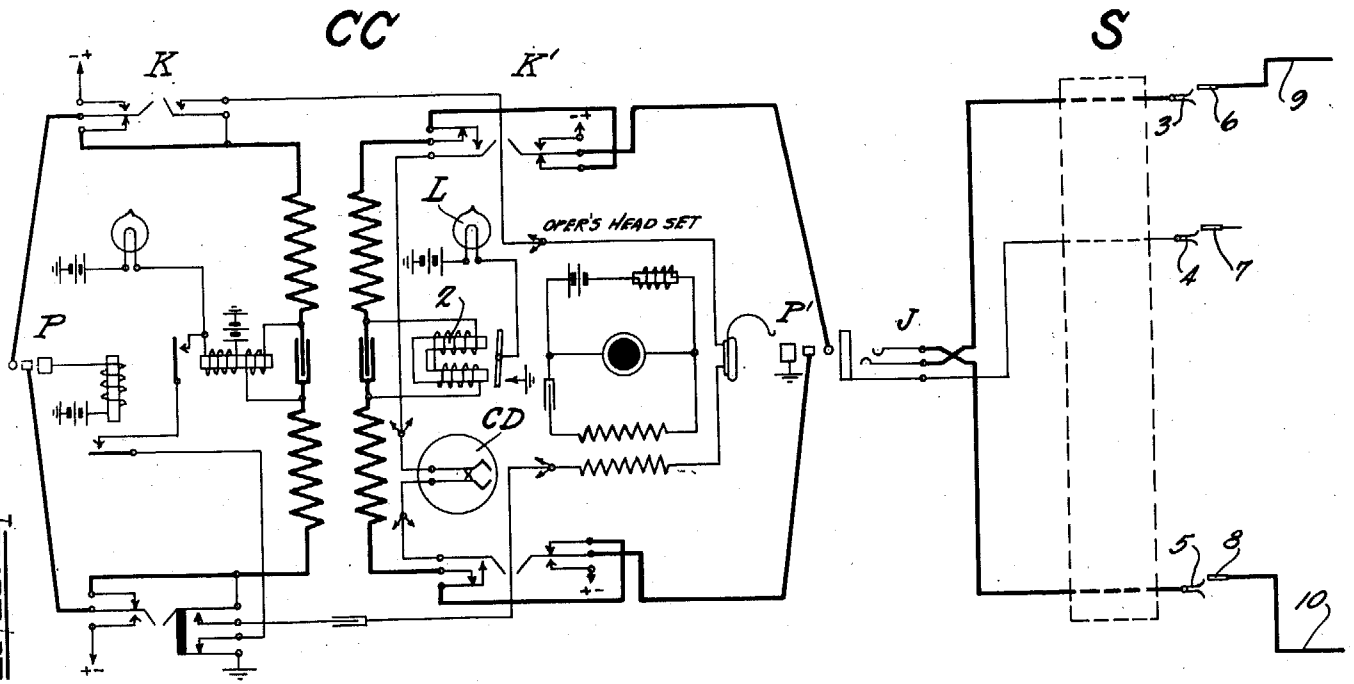
Fig. 1 shows a three conductor toll service trunk extending from the jack J at the toll board to the selector S located in the same office as the toll board. This drawing shows also the cord circuit CC which is one of the cord circuits used by the toll operator to complete connections to the toll service trunks through the jacks such as J.

It will now be assumed that the toll operator at the switchboard shown in Fig. 1, desires to extend a connection to the line of substation A', either because she has received a long distance call for him, or because he himself has requested that a long distance connection be set up, and the operator is therefore recalling him. The operations are the same in both cases.

To extend the connection to the line of substation A' the operator inserts the plug of a cord circuit, for example the plug P' of the cord circuit CC, into the jack J of a toll service trunk line terminating at her switchboard and extending at the distant end to the selector S. The selector S, it may be pointed out, is assumed to be similar to the intermediate selector shown in Fig. 3 except that the line relay of the selector S is assumed to be of the double-wound battery feed type instead of the single-wound type to which line relay 201 of the intermediate selector shown in Fig. 3, belongs. That is, the upper winding connects at one terminal to battery and at the other terminal to the upper line conductor through contacts on the switching relay, while the lower winding of the relay connects at one terminal to ground and at the other terminal to the lower line conductor through contacts on the switching relay. Accordingly, the selector S is prepared for operation in the usual manner when the plug P' is inserted into the jack J, but the polarized relay 2 of the cord circuit CC does not operate because of the direction of the current flow.

The calling operator now throws her combined calling device and ringing key into dialling position, thereby connecting up her common calling device CD in bridge of the tip and ring conductors of the plug P' whereupon she manipulates the calling device in accordance with the digits necessary to trunk the call to the line of substation A, after which she restores the calling device key.

It may be pointed out that no director is involved in extending the connection to the line of substation A. It is feasible to do away with the directors on calls from the toll operators on account of the fact that these operators are informed of the respective digit combinations that they must dial in order to trunk the calls to the desired offices, after which they dial the four subscriber digits as they appear in the directory.

When the operator manipulates her calling device CD in accordance with the first digit, the selector S raises its wipers 3—5 step-by-step until they come to rest opposite the desired level of bank contacts and then rotates them into engagement with a set of bank contacts associated with an idle trunk line, for example the bank contacts 6—8 associated with the trunk line comprising conductors 9 and 10, whereupon the switching relay (not shown) of the selector S, completes the connection to the wipers of the switch in the usual manner. When this occurs, line relay 107 of the transmission selector repeater, Fig. 2, in the distance office, whose upper wniding is connected through the normally closed contacts controlled by armature 128, armature 121 and its resting contact, and the upper left hand repeating coil winding to the conductor 9, energizes over the calling loop, conductor 10 being grounded through the normally closed contacts controlled by armature 125, lower left hand repeating coil winding, normally closed contacts controlled by armature 122, and the normally closed contacts controlled by armature 130. Upon energizing, relay 107 closes at armature 135 a circuit for release relay 108, which relay energizes and prepares the vertical magnet circuit at armature 137, and grounds conductor 117 at armature 136. As a result of the placing of ground potential on conductor 117, relay 104 energizes through off-normal contacts 112 and closes at armature 127 a circuit for the switch-over relay 103. Switch-over relay 103 energizes and prepares at armature 126 a circuit for subsequently grounding wiper 153, at the same time cutting off the lower left-hand repeating coil winding; completes at armature 123 a new circuit for relay 104 from ground through the normally closed contacts controlled by armature 142, armature 134 and its working contact, and the working contact and armature 123; at armature 124 short circuits the upper left hand repeating coil winding so as to improve the impulsing circuit; and at armature 125 places ground directly on conductor 10 independent of the lower left-hand repeating coil winding, at the same time disconnecting conductor 10 from the lower terminal of the lower left-hand repeating coil winding and placing ground on conductor 118 preparatory to grounding the wiper 152 for a purpose to be pointed out hereinafter.

When the calling operator dials the next digit in the desired number, line relay 107 of the transmission selector repeater falls back a corresponding number of times. Upon each deenergization it closes at armature 135 a circuit through armature 137 and its working contact and armature 146 and its resting contact for vertical magnet 115, with the result that the wipers 150—153 are raised opposite the desired level of bank contacts in the usual manner. Relay 109 is energized in multiple with vertical magnet 116, and, being slow acting, maintains its energization throughout the vertical movement. At armature 138 relay 109 closes a temporary circuit for holding relay 103 operated during the interruptions in the circuit at armature 134 after the initial circuit of relay 104 has been opened at off normal contacts 112 upon the first vertical movement of the switch. As a further result of the energization of relay 109, a circuit is closed at armature 144 and its resting contact, and off-normal contacts 119 for stepping relay 110. This circuit is closed as soon as off-normal contacts 119 close upon the first vertical step, whereupon relay 110 operates and closes a locking circuit for itself at armature 141 from ground through the resting contact and armature 129, which circuit includes the interrupter contacts 143 and the off normal contacts 119. At armature 140 relay 110 prepares a circuit for rotary magnet 118.

At the end of the vertical movement, line relay 107 comes to rest energizes and again completes at armature 134 the locking circuit of relay 104. Relay 109 shortly deenergizes and opens the temporary holding circuit of relay 103 at armature 138. As a further result of its deenergization relay 109 completes at the normally closed contacts controlled by armature 139 a circuit through the working contact and armature 140 of rotary magnet 115. The final result is that the transmission selector repeater selects an idle trunk line in the second level in a manner similar to that described in connection with the other selectors and selector repeaters. Assuming that the trunk line comprising conductors 158—161 is the first one found to be idle, switching relay 111 of the transmission selector repeater energizes when the wipers reach this trunk line; cuts off vertical magnet 116 at armature 146; at armature 144 disconnects armature 139 to prevent subsequent energizations of relay 109 from operating stepping relay 10; connects up wiper 152 at armature 147; opens the test circuit and places ground on test wiper 151 at armature 145; prepares a circuit for reversing relay 105 at armature 149; and at armatures 142 and 148 connects up the wipers 150 and 153, at the same time removing the local ground from the circuit of 104. Relay 104, however, remains energized in series with the line relay of the seized intermediate selector. Fig. 3, the lower wiper 153 of the transmission selector repeater now being grounded at armature 126 and its work-in contact through the working contact and armature 148 to form a return circuit for relay 104.

The intermediate selector, Fig. 3, is now prepared for operation in the usual manner.

When the calling operator dials the next digit in the desired number, the intermediate selector operates in a hereinbefore described manner to extend the connection to an idle connector in the desired group, for example, the connector shown in Fig. 4.

When the connector shown in Fig. 4, is seized the operations are the same as described in connection with the previous seizure with the exception that, since in this case there is a ground potential extended ahead from the grounded ringing control wiper 152 of the transmission selector repeater through conductor 160 and wiper 243 to conductor 247, a circuit is closed immediately upon the seizure of the connector through armature 330 and its resting contact for the ring-cut-off relay 304. Ring-cut-off relay 304 thereupon energizes and locks itself at armature 332 to the grounded release trunk conductor 246. At the same time, however, relay 303 energizes from the grounded conductor 246 through off-normal contacts 262 and shifts the grounded conductor 247 from the lower terminal of the winding of the relay 304 to the junction of the lower winding of relay 304 and resistance 356, thereby short circuiting relay 304 and bringing about its deenergization. The foregoing operation of relay 304 is described at this time because it actually takes place. However, this operation has no particular utility at this time, and the control of ring-cut-off relay 304 over conductor 247 does not take place until later. As a further result of the seizure of the connector, the line and release relays 302 and 301 are energized and the switch is prepared for operation in the usual manner.

The calling operator now turns her calling device in accordance with the next digit in the desired number, whereupon the vertical operation of the connector takes place in the usual manner and relay 303 falls back at the end of the vertical operation responsive to its circuit being finally opened at armature 335 of relay 305 which is maintained operated throughout the vertical operation. Upon falling back, relay 303 connects the ringing control conductor 247 at armature 330 to the lower terminal of the lower winding of relay 304 again, whereupon relay 304 again energizes and locks itself to the grounded release trunk conductor 236 at armature 332.

The operator now dials the next and last digit in the number, whereupon the rotary operation of the connector takes place in the manner hereinbefore described. At the end of the rotary operation, the busy relay 305 remains up and is locked energized in case the called line is busy, and the switching relay 307 energizes in case the called line is idle. In either case the line relay 302 is disconnected from in bridge of the line conductors 245 and 248 in the manner hereinbefore described with the result that relay 104 in the transmission selector repeater, Fig. 2, falls back and opens at armature 127 the circuit of the switch-over relay 103. Relay 103 falls back and connects up the battery feed relay 102 through the right hand repeating coil windings and disconnects relay 104 and ground from the talking circuit at armatures 123 and 126, and at armatures 124 and 125 includes the left hand repeating coil windings in the circuit again. As a further result of its deenergization, relay 103 closes at armature 126 and its resting contact a circuit through armature 149 and its working contact, for relay 105. Relay 105 thereupon energizes and removes ground from the working contact of armature 141 at armature 129, and at armatures 128 and 130 connects battery (through the upper winding of relay 107 and resistance 132) to the positive talking conductor 10 through the lower left-hand repeating coil winding, and connects ground (through the lower winding of relay 107 and the resistance 131) to the negative talking conductor through the upper left-hand repeating coil winding, at the same time bridging relay 106, in series with the associated condenser, across the left-hand talking condenser in order to permit the operator to control the application of the ringing current to the called line.

At the manual switchboard, Fig. 1, the polarized relay 2 responds to the reversal of the battery and ground connections to the trunk conductors 9 and 10 at the transmission selector repeater, Fig. 2, and lights the supervisory lamp L to inform the operator that the switch-over operation has taken place.

Assuming now that the above switch-over operation took place responsive to a busy condition of the called line and that the busy relay 306 of the connector, Fig. 4, is therefore energized, the common busy signalling lead 501 is connected to the lower talking conductor and battery and ground are alternately placed on the lower talking conductor by the busy signalling apparatus, Fig. 6. Accordingly, the battery feed relay 102, Fig. 2 whose lower winding is connected to the lower talking conductor, energizes each time ground is placed on the lower talking conductor, and at armature 122 closes a local holding circuit for relay 107, at the same time disconnecting line relay 107 from the conductors 9 and 10 at armature 121 and at the normally closed contacts controlled by armature 122. This results in the deenergization of the polarized relay 2, Fig. 1, and in the lamp L being extinguished. When ground is again removed by the common busy signalling apparatus, relay 102 again falls back with the result that relay 2, Fig. 1, again operates and lights the lamp L. This flashing continues until the operator removes the plug P′ from the jack J to release the connection.

It will be assumed now that the switch-over operation takes place responsive to an idle condition of the called line as indicated by the energization of switching relay 307 of the connector Fig. 4. When relay 307 pulls up, it disconnects line relay 302 at armature 341 and at the same time closes at armature 344 a circuit for relay 303. The disconnection of line relay 302 brings about the deenergization of relays 104 and 103 of the transmission selector repeater, Fig. 2, and relay 103 disconnects ground from the associated ringing control conductor at the normally open contacts controlled by armature 125. This latter operation may not in all cases be completed prior to the energization of relay 303 of the connector, which as above pointed out takes place responsive to the energization of switching relay 307, in which case the ringing control conductor 247 is switched to the junction of the lower winding of relay 304 and resistance 356 before it is ungrounded at the transmission selector repeater. This, however, does not result in the deenergization of relay 304 on account of the fact that the relay is slow acting, especially when its lower winding is short circuited. Furthermore, the deenergization of relays 104 and 103 of the transmission selector repeater takes place very quickly.

It will be understood of course that the supervisory lamp L, Fig. 1, is lighted steadily in this case.

When the operator desires to signal the subscriber at substation A′, she throws her key K′ into ringing position thereby projecting a ringing current out over the established connection to the transmission selector repeater, at which point the alternating current relay 106, which (as above pointed out) is bridged across the left hand talking condenser, energizes and at armature 133 places ground on the ringing control conductor 118. This results in the short circuiting of the lower winding of the ring-cut-off relay 304 of the connector, Fig. 4. Relay 304 falls back and closes the intermittent ringing circuit to the called line. The operator restores her key after a sufficiently long interval to insure that the ringing has actually started and she may then throw her key K into listening position and hear the ring-back tone which is placed on the talking circuit in the manner hereinbefore pointed out.

When the subscriber at substation A′ responds to the ringing of his bell by removing his receiver, the ring-cut-off relay 304 operates and locks itself energized in the hereinbefore described manner and completes the talking circuit at armatures 331 and 333. When this occurs, the battery feed relay 102, Fig. 2, pulls up over the called line and closes the before mentioned local locking circuit of line relay 107 and disconnects line relay 107 from the calling loop at armature 121 and at the normally closed contacts controlled by armature 122. When this occurs, the polarized relay 2 in the cord circuit CC, Fig. 1, falls back and puts out the lamp L to inform the operator that the called subscriber has answered.

Assuming that a connection has been set up to the other party desired through the plug P in the usual manner, the conversation may now proceed as desired.

When the conversation is terminated, the called subscriber replaces his receiver, whereupon the battery feed relay 102 of the transmission selector repeater falls back and connects line relay 107 to the calling loop, whereupon the polarized relay 2, Fig. 1, pulls up and lights the lamp L as a disconnect signal.

The operator now removes the plug P′ from the jack J whereupon the line relay 107 of the transmission selector repeater falls back and opens the circuit of release relay 108, which falls back and at armature 136 removes ground from conductor 117 and at armature 137 closes the release magnet circuit through off-normal contacts 113. The switching relay 111 falls back and opens the circuit of relay 105 which falls back also, and the release magnet 114 energizes and restores the switch to its normal position.

The intermediate selector, Fig. 3, and the connector, Fig. 4, are released in the hereinbefore described manner.

The entire connection is now released and the apparatus is ready to be used in another connection.

*Call from non-inverted office to substation A′*

Referring now particularly to Fig. 12, which shows an incoming selector repeater designed to handle calls incoming to the inverted system from an office, in the same multi-office telephone system in which the switches are operated according to the system of supplying talking battery to both subscribers from the connector switch, it may be assumed that the calls originating in the office in question are handled by directors in much the same manner as the subscriber-to-subscriber calls hereinbefore described. More specifically, it may be assumed that the director system used in the office under discussion is similar to the system shown and described in the British Patent 194,580 of 1923. It may be assumed further that the connection to the trunk line comprising conductors 1101 and 1102 is made at the outgoing end thereof through an impulse repeater of any well known type such for example as the one shown on page 70 of Automatic Telephony, third edition, by Smith and Campbell, published by McGraw-Hill Book Co. Inc.

Assuming now that a subscriber in the non-inverted office is making a call intended for the subscriber at substation A', Fig. 4, and that the connection is extended by a selector switch in the non-inverted office by way of an out-going impulse repeater to the out-going end (not shown) of the trunk line comprising conductors 1101 and 1102, the impulse repeater closes a bridge across conductors 1101 and 1102, whereupon line relay 1104 of the incoming selector repeater, Fig. 12, pulls up and closes at armature 1124 a circuit for release relay 1105. Release relay 1105 thereupon energizes and grounds conductor 1112 at armature 1125 and prepares the vertical magnet circuit at armature 1126. Line relay 1104 also closes at armature 1123 a circuit from ground by way of the lower winding of relay 1109, normally closed contacts controlled by armature 1136, armature 1123 and its working contact, and relay 1107 to battery. Relays 1109 and 1107 energize over this circuit, and change-over relay 1109 closes at armature 1132 a point in the locking circuit of its upper winding, and at armatures 1131 and 1133 opens corresponding points in the talking conductors and bridges the upper talking condenser across conductors 1101 and 1102 so as to improve the operation of relay 1104, at the same time placing a shunt around relay 1108. Relay 1107, upon energizing, prepares at armature 1128 the circuit of reversing relay 1103 and completes at armature 1129 a circuit from the grounded conductor 1112 and through the working contact and armature 1132 for locking the upper winding of relay 1109 energized.

When the next digit 3 in the desired number is transmitted, line relay 1104 is deenergized three times, and, upon each deenergization, it closes at armature 1124 a circuit through armature 1126 and its working contact and armature 1139 and its resting contact for vertical magnet 1153. Vertical magnet 1153 is accordingly energized three times, and the wipers 1141—1143 are as a result raised opposite the third level of bank contacts. Slow acting relay 1106 is energized in multiple with the vertical magnet 1153 and at armature 1127 it prepares a circuit which is completed from the grounded conductor 1112 through the working contact and armature 1127, resting contact and armature 1138 and the off-normal contacts 1155 for stepping relay 1110 as soon as off-normal contacts 1155 close upon the first vertical step. Relay 1110 energizes and prepares the rotary magnet circuit at armature 1134 and at armature 1155 completes its locking circuit from ground by way of the working contact and armature 1133, armature 1140 and its resting contact, armature 1135 and its working contact, interrupter contacts of the rotary magnet 1154, off-normal contacts 1155, and relay 1110 to battery. As a further result of its energization, relay 1106 closes at the normally open contacts controlled by armature 1127 a shunt around armature 1129 and its working contact of relay 1107 so as to maintain the locking circuit of the upper winding of relay 1109 intact during the impulsing period independent of armature 1129, which is retracted upon each deenergization of line relay 1104 due to the opening of the circuit of relay 1107 at armature 1123.

An instant after the termination of the vertical movement, slow relay 1106 falls back and completes at the normally closed contacts controlled by armature 1127 the rotary magnet circuit through armature 1134 and its working contact. Rotary magnet 1134 thereupon energizes and advances the wipers into engagement with the first set of bank contacts in the third level, at the same time opening the circuit of stepping relay 1110, which falls back and opens the rotary magnet circuit. The rotary magnet thereupon falls back and again closes its interrupter contacts. The switching relay 1111 now operates in case the first trunk is idle, but it does not operate in case the first trunk is busy, in which case the rotary movement continues in the manner hereinbefore explained until an idle trunk is reached, whereupon switching relay 1111 operates to seize the trunk. It will be noted that armature 1137 opens the test circuit and grounds the test wiper 1142 to make the seized trunk busy; armature 1138 disconnects the stepping relay 1110 from armature 1127 so as to prevent subsequent energizations of relay 1106 from operating relay 1110; armature 1139 cuts off the vertical magnet 1153; and armatures 1136 and 1140 connect up the line wipers 1141 and 1143 to the battery feed relay 107 and ground respectively.

Relay 1107 is now maintained operated in series with the line relay of the switch to which the seized trunk extends, for example, line relay 201 of the intermediate selector, Fig. 3.

When the next digit is transmitted, this digit is repeated by the incoming selector repeater, Fig. 12, to the seized intermediate selector, Fig. 3, which operates to extend the connection to an idle connector, for an example, the one shown in Fig. 4.

When the next two digits are transmitted, they are repeated to the seized connector which extends the connection to the line of substation A', removed from across the talking conductors with the result that the relay 1107 in the incoming selector repeater falls back and opens at armature 1129 the locking circuit of change-over relay 1109, which relay falls back and opens a further point in its locking circuit at armature 1132, at the same time closing points in the talking circuit at armatures 1131 and 1133.

In case the switch-over operation above described occurs responsive to a busy condition, the busy signalling current is transmitted back over the lower heavy talking conductor to the calling line to inform the calling subscriber of the busy condition of the called line. In this case there is an incidental operation of the positive battery-feed relay 1108, Fig. 12, but this does not produce any other operation as relay 1107 is not energized at this time.

Assuming now that the switch-over operation occurs as a result of an idle condition on the called line, the calling subscriber hears the usual ring-back tone and knows that the called subscriber is being signalled.

When the called subscriber answers, the ringing current is removed at the seized connector switch, Fig. 4, by the ring-cut-off relay 304, which completes the talking circuit at armatures 331 and 333, whereupon the battery feed relays 1107 and 1108, Fig. 12, pull up over the called line and close at armatures 1128 and 1130 the circuit of reversing relay 1103. Reversing relay 1103 thereupon operates and reverses the connection of conductors 1101 and 1102 with line relay 1104. This operation results in the reversal of the direction of current flow in conductors 1101 and 1102, which brings about the usual reversing operation in the impulse repeater. This may be used, when desired, to give supervision to operators, or to operate meters and the like. When the conversation is terminated, the two subscribers replace their receivers. Assuming that the receiver is replaced at the called substation first, battery feed relays 1107 and 1108 fall back and open the circuit of reversing relay 1103, which falls back and reverses the current flow in conductors 1101 and 1102 to normal.

When the receiver is replaced at the calling substation, line relay 1104 falls back and opens the circuit of release relay 1105 and prepares the release magnet circuit at armature 1124. Release relay 1105 falls back and removes ground at armature 1125 from wiper 1142 to permit the release of the intermediate selector, Fig. 2, and the connector, Fig. 4, and close its own release magnet circuit at armature 1126 through off normal contact 1151. Release magnet 1152 brings about the release of the switch.

*Operation of rotary connector*

Referring now particularly to Figs. 3 and 6, the operation of the combination toll and regular rotary connector shown in Fig. 6 will now be explained. For this purpose it will be assumed that the intermediate selector shown in Fig. 3, is operated in accordance with the digit 1 (in a call to substation $A^2$) and that it selects the trunk line comprising conductors 261—264 leading to the rotary connector shown in Fig. 6. When this occurs the release trunk conductor 262 is grounded in the usual manner, thereby closing a circuit through off-normal spring 520 and its lower contact for relay 513. Relay 513 thereupon energizes and shifts the ringing-control conductor 263 from the lower terminal to the upper terminal of the lower winding of relay 514 at armature 542; closes at armature 541 a point in the circuit of release relay 511; prepares a locking circuit for itself at armature 540, and at armature 539 disconnects the operating conductor from the rotary magnet 524 and connects it to the vertical magnet 523. As a further result of the seizure of the connector, line relay 512, whose lower winding is bridged across conductors 261 and 264 through the resting contact and armature 559, and off-normal contacts 578, energizes and completes at armature 537 a circuit from the grounded release trunk conductor 262 through off-normal contacts 527, armature 537 and its working contacts, and armature 541 and its working contact for release relay 511. Release relay 511 energizes and prepares the operating circuit at armature 531, at armature 533 removes the shunt from around off-normal contacts 531′ and connects release trunk conductor 262 to the local conductor 278, at the same time disconnecting direct ground from the latter; opens a point in the release magnet circuit and closes a locking circuit for itself at armature 534; and at armature 530 by-passes off-normal contacts 578 so as to maintain the line relay 512 bridged across the line conductors after the off-normal contacts 578 operate on the first vertical step.

When the transmission of the next digit occurs, line relay 512 deenergizes a corresponding number of times, and, upon each deenergization, it closes at armature 535 a circuit through the series relay 515 and armature 539 and its working contact for vertical magnet 523. The vertical magnet 523 operates to raise the wipers 564—567 opposite the desired level of bank contacts. It will be noted that relay 516 is connected in multiple with the vertical magnet through the resting contact and armature 546 when the first impulse of current is transmitted. This permits relay 516 to energize quickly responsive to this first impulse of current. Relay 515 it will be noted is operated in series with the vertical magnet and, being slow acting, maintains its energization throughout the vertical movement. At armature 546 relay 515 disconnects relay 516 from in multiple with the vertical magnet and closes a local circuit for the said relay 516. Relay 516, upon energizing, closes at armature 551 a locking circuit through armature 540 and its working contact to maintain relay 513 energized after its initial circuit is opened upon the first vertical step at off normal spring 520 and its resting contact.

Upon the termination of the vertical movement, relay 515 falls back, followed by the deenergization of relay 516, the latter relay opening at armature 551 the circuit of relay 513, whereupon relay 513 falls back and shifts the operating circuit from the vertical magnet 523 to the rotary magnet 524.

When the next digit is received by the line relay of the connector, the rotary magnet circuit is closed upon each deenergization of the said line relay 512. Accordingly, the rotary magnet 524 operates to advance the wipers of the switch into engagement with the contacts 568—571 associated with the line of substation $A^2$. Relays 515 and 516 again energize and relay 515 shunts armature 556 and its resting contact of busy relay 517 at armature 549. Relay 517 at armature 550 disconnects test wiper 565 from the test winding of relay 518 and connects it to busy relay 517 instead.

The operation taking place at the end of the rotary movement depends, as usual, upon whether the called line is busy or idle. Assuming that the line is busy, relay 517 is energized when the wipers of the switch land on the bank contacts of the called line. In this case when relay 515 falls back it connects at armature 547 the upper winding of relay 512 to the rotary test wiper through armatures 552 and 555 and contacts 521, and it opens at armature 549 the locking circuit of release relay 511. Relay 511 falls back and disconnects the lower winding of relay 512 from across the line conductors at armature 530 to bring about the usual switchover operation. Relay 511 also closes at armature 532 a point in the automatic rotary circuit for rotary magnet 524, and at armature 533 closes a point in the locking circuit of the upper winding of relay 512. In the present case, however, the rotary test contact 570 is not connected with the regular test contact 569 on account of the fact that the line of substation $A^2$ is not a line of a rotary group. For this reason, no holding circuit is closed for the upper winding of the combined stepping and line relay 512 and this relay falls back responsive to the disconnection of its lower winding and opens at armature 536 a point in the circuit of rotary magnet 524 and at armature 537 opens a point in its locking circuit.

There is a special adjustment of the various armature springs of relay 511 as will now be pointed out. As soon as the armature proper of relay 511 starts to restore, armature spring 530 at its working contact breaks the circuit of the lower winding of the combined line and stepping relay 512, whereupon relay 512 quickly falls back to open a point in the locking circuit of its upper winding at armature 537, as above pointed out. This point in the locking circuit of relay 512 must be opened before the back stroke of the armature proper of relay 511 is completed as the locking circuit would otherwise be always completed upon the engagement of armature spring 533 of relay 511 with its resting contact. In order to insure that relay 512 has plenty of time to fall back (responsive to the separation of armature 530 from its resting contact) before armature 533 engages its working contact, the adjustment of the various armature springs of the relay is such that armature 533 does not engage its resting contact until just as the backward stroke of the armature proper of relay 511 is completed. Furthermore, the armature of relay 511 is arranged so that it has a relatively long stroke so that the amount of time consumed in making the backward stroke will be great enough to permit relay 512 to fall back.

A moment later relay 516 falls back, whereupon the locking circuit of busy relay 517 is completed at the normally closed contacts controlled by armature 550. The energization of busy relay 517 results in the connection of the common busy signaling conductor 501 to the lower heavy talking conductor with the hereinbefore pointed out results.

Assuming now that the desired line is idle when called, busy relay 517 is not energized when the wipers of the switch land on the bank contacts of the called line and, when relay 516, falls back, it completes at armature 550 a circuit from the grounded release trunk conductor 261 through armature 554 and its resting contact, upper winding of relay 518, resting contact and armature 550, test wiper 565, bank contact 569, relay 576, and magnet 577 to battery. Relay 576 operates in the usual manner to disconnect the associated line relay and the ground from the associated line. Relay 518 energizes over the above circuit and closes a locking circuit for its lower winding at armature 561; connects the release trunk conductor to the test wiper at armature 560; disconnects the upper winding of the line relay 512 at armature 559 to bring about the switch-over operation; opens the circuit of release relay 511 and closes a circuit for relay 513 at armature 562; and at armatures 558 and 563 connects up the line wipers 564 and 567 whereupon the bridged bell at substation $A^2$ is intermittently operated in the usual manner. Relays 512 and 511 now fall back and relay 513 energizes and closes at armature 538 the usual ring back circuit through conductor 526.

When the called subscriber responds, ring-cut-off relay 514 energizes and locks itself to the release trunk conductor at armature 544 and disconnects the ringing current and closes points in the talking circuit at armature 543 and 545. The calling and called subscribers may now converse with each other in the usual manner.

The release of the connector shown in Fig. 6 takes place upon the removal of ground from the release trunk conductor 262 and results from the deenergization of relay 518, the release magnet circuit being as follows: from ground through the normally closed contacts controlled by armature 533, armature 562 and its resting contact, resting contact and armature 556, armature 534 and its resting contact, and off normal contacts 519 to battery through the release magnet 522. The release of the other switches in the connection takes place in the usual manner.

Assuming now that the connector shown in Fig. 6 is operated into engagement with the bank contacts 572–575 inclusive, which are assumed to be associated with a line of a rotary group, and assuming further that this line is busy, there is a ground potential on the test contact 573 which results in the energization of busy relay 517 when the wipers of the switch land on the bank contacts of the called line. Also, since the associated line is the first one of a rotary group, the regular test contact 573 is connected with the rotary test contact 574 through the jumper 580. Accordingly the rotary test wiper 566 encounters a ground potential. That being the case, when relay 515 falls back at the end of the rotary movement it closes at armature 547 the following circuit: from ground by way of the rotary test wiper 566, working contact and armature 555, working contact and armature 552, armature 547 and its resting contact, interrupter contacts 521 of rotary magnet 524, and the upper winding of relay 512 to battery. Therefore, when relay 511 falls back and at armature 530 disconnects the lower winding of relay 512 from in bridge of conductors 261 and 264, relay 512 remains operated over the above traced circuit. When armature 533 of relay 511 engages its resting contact it closes a locking circuit from the grounded release conductor 262, through armature 537 of relay 512 and its working contact, armature 541 and its resting contact, and the interrupter contacts 521 for the upper winding of the relay 512. As a further result of the deenergization of relay 511, a circuit is closed at armature 532 from the grounded release trunk conductor 262 through off-normal spring 520 and its upper contact, resting contact and armature 532, working contact and armature 536, armature 539 and its resting contact, and rotary magnet 524 to battery. Rotary magnet 524 operates over this circuit and advances the wipers of the connector another step, at the same time opening the circuit of the upper winding of relay 512 at interrupter contacts 521. Relay 512 falls back and opens a further point in its locking circuit at armature 527, and at armature 536 opens the circuit of rotary magnet 524, whereupon rotary magnet 524 falls back and closes its interrupter contacts 521 again.

From this point the operation depends upon whether the line associated with the next set of bank contacts is busy or idle. If this line is busy and if it is not the last line of the group, the rotary test wiper 567 engages a ground potential on the rotary test contact of the line, closing a new circuit for the upper winding of relay 512 with the result that relay 512 energizes again whereupon the rotary magnet 524 energizes responsive to the closure of its circuit at armature 536 and advances the wipers of the switch another step.

If all the remaining lines in the rotary group are busy, the wipers of the connector are rotated into the engagement with the last set of bank contacts in the group, whereupon the rotary movement ceases on account of the fact that the regular test contact and the rotary test contact of this line are not jumpered together. Accordingly, busy relay 517 remains energized over the regular test contact, and its locking circuit is closed in the usual manner when relay 516 falls back due to the cessation of the rotary movement. The busy signal is transmitted back to the calling subscriber in the usual manner.

Assuming that the connector finds an idle line in the group, the rotary movement ceases due to the fact that wiper 566 no longer engages a grounded contact and busy relay 517 falls back. That being the case, switching relay 518 pulls up in the usual manner when relay 516 falls back, with the result that the connection is completed in the hereinbefore described manner.

Regarding the use of this connector as a toll connector, it will be noted that the ringing control conductor 263 is connected to one terminal or the other of the lower winding of the ring cut-off relay 514 by the change-over relay 513 with results similar to those pointed out in connection with the connector shown in Fig. 4.

*Modified non-rotary connector*

Referring now particularly to Fig. 5, which shows a modification of the connector shown in Fig. 4, this modification will now be explained. It will be assumed that the conductors 245′—248′ are joined with the conductors 245—248, Fig. 3, respectively. Assuming now that this connector is thus substituted for the connector shown in Fig. 4, and that it is seized by the intermediate selector shown in Fig. 3, the release trunk conductor 246′ is grounded. Line relay 402 now energizes over line conductor 245′ and through off-normal contacts 415 and the normally closed contacts controlled by armature 435, and closes at armature 417 a circuit from the grounded release trunk conductor 246′ through the rotary off-normal spring 414 and its normal contact, for release relay 401. Also, a circuit is closed in multiple with release relay 401 through off-normal contacts 412 for the lower winding of relay 406. Relay 401 energizes and locks itself at armature 433, and opens the release magnet circuit at armature 434; prepares the impulsing circuit at armature 432; and at armatures 431 and 435 connects line relay 402 across the line independent of off-normal contacts 415, at the same time disconnecting the lower terminal of relay 402 from ground. Relay 406 upon energizing disconnects the operating conductor from rotary magnet 408 and connects it to vertical magnet 407.

When the next digit is transmitted, line relay 402 falls back a number of times, and each time it does so, it closes at armature 416 a circuit from ground through armature 432 and its working contact and through armature 448 and its working contact for the vertical magnet 407. Vertical magnet 407 operates to raise the wipers 452—454 opposite the desired level of bank contacts. Relay 404 is energized in multiple with the vertical magnet 407 throughout the vertical operation, and at armature 440 maintains a circuit closed through armature 449 and its working contact for relay 406 after the initial circuit of this relay is opened at off normal contacts 412 upon the first vertical step of the switch shaft.

At the end of the vertical movement, relay 404 falls back and opens at armature 440 the circuit of relay 406 which relay falls back and shifts at armature 448 the operating circuit from vertical magnet 407 to rotary magnet 408.

When the next digit is transmitted, the resulting impulses of current are delivered through armature 448 and its resting contact to rotary magnet 408, which operates to bring the wipers 452—454 into engagement with the bank contacts 350—352 of the line of the called substation A′. Relay 404 operates during the rotary movement in the same manner as during the vertical movement and disconnects test wiper 453 from the test winding of relay 406 and connects it to busy relay 404. Relay 405 at armature 441 shunts rotary off normal spring 414 and its normal contact so as to maintain the locking circuit of relay 401 closed after spring 414 shifts on the first rotary step.

At the end of the rotary movement, relay 404 falls back and opens the circuit of relay 401, whereupon relay 401 falls back and cuts off line relay 402, bringing about the usual switchover operation.

If the called line is busy, busy relay 405 locks up at armature 442, when relay 404 falls back. The busy tone is applied to the calling line through armatures 444 and 435.

Assuming, however, that the called line is idle, busy relay 405 is not energized when the wipers come to rest on the bank contacts of the called line and the deenergization of relay 404 results in a circuit being closed at armature 439 as follows: from the grounded release trunk conductor 246′ through armature 442 and its resting contact, upper winding of relay 406, resting contact and armature 439, wiper 453, bank contact 351, relay 353, and magnet 355 to battery. Relays 406 and 353 energize over this circuit and relay 353 disconnects line relay 354 and ground from the conductors of the called line. Relay 406 completes a locking circuit from the grounded release trunk conductor 246′ through rotary off normal spring 414 and its alternate contact, and armature 449 and its working contact for its own lower winding; shunts its own upper winding so as to place a direct ground potential on test wiper 453 at armature 457; and connects up the line wipers 452 and 454 to start the ringing operation at armatures 445 and 451.

It will be noted that the release magnet circuit includes armatures 450 and 443 of relays 406 and 405, respectively, in addition to armature 434 of relay 401. Therefore the release magnet circuit is maintained open at armature 443 or at armature 450 after relay 401 falls back. Relay 401 is made slow acting to prevent it from falling back and closing the release magnet circuit before relay 406 pulls up when the called line is idle.

When the called subscriber responds, ring cut-off relay 403 energizes and locks its upper winding to release trunk conductor 246′ at armature 437, and disconnects the ringing current and ground from the upper and lower wipers respectively and completes corresponding points in the talking circuit.

When the conversation is completed, the releasing operation takes place responsive to the deenergization of relay 406 when the release trunk conductor 246′ is ungrounded, the circuit of release magnet 409 being as follows: from ground by way of armature 450 and its resting contact, armature 443 and its resting contact, armature 434 and its resting contact, and off normal contacts 410 to battery through release magnet 409.

The control of the ringing on calls from the toll board is accomplished in the hereinbefore described manner.

*Modified reverse battery repeater*

Referring now particularly to Figs. 9 and 10, the differences between the reverse battery repeaters shown in these two drawings will now be explained. These repeaters, it will be understood, are largely similar to each other, both containing the same number of relays having similar functions to perform. However, two main differences may be noted. In the first place, relay 803 of Fig. 9, reverses the direction of current flow, as above pointed out, in the conductors 818 and 819 by closing at armatures 809 and 810 local circuits for the windings of relay 805 when it falls back, while relay 903 reverses the direction of current flow in conductors 818 and 819 by actually reversing the connection between relay 905 and the said conductors 818 and 819 at armatures 909 and 910. The former arrangement permits a simple spring combination on relay 803, as compared with the spring combination on relay 903, and furthermore makes possible a better adjustment of the armature springs of relay 803 than can be placed on the armature springs of relay 903 due to the inevitable followup of the make-before-break contacts of relay 903, on the other hand, however, the current drain occasioned by the use of the reverse battery repeater shown in Fig. 10, is less than the current drain occasioned by the use of the one shown in Fig. 9, on account of the fact, that, upon the back stroke of relay 803, local circuits are closed for the windings of relay 805, drawing some considerable current in addition to the current that actually traverses conductors 818 and 819 during that period. The use, therefore, of one or the other of the repeaters in any given situation will depend on the local requirements, such as the cost of current, and so forth.

Regarding the other difference in the circuits of the two repeaters, this difference is in the arrangement provided for initially energizing the relays 804 and 805 of Fig. 9 and the relays 904 and 905 of Fig. 10. As hereinbefore explained, relays 804 and 805 are energized in multiple upon the energization of line relay 803. In Fig. 10, however, relay 903 energizes upon the seizure of the repeater and merely reverses the associated connections of the windings of relay 905, but does not operate either relay 904 or relay 905. Responsive to the grounding of release trunk conductor 795, a circuit is closed through the normally closed contacts controlled by armature 907, normally closed contacts controlled by armature 914, resistance 915, and the lower winding of relay 905 to battery. Relay 905 thereupon energizes and opens at armature 916 a point in the circuit of the switchover relay 901, and closes at armature 916 and its working contact a circuit for relay 904. Relay 904 thereupon energizes and locks itself at armature 914, at the same time opening the initial circuit of relay 905 at the normally closed contacts controlled by armature 914, and completing the connection between the windings of relay 905 and conductors 818 and 819 at armatures 911 and 912 to maintain relay 905 energized over the said conductors. Relay 904 also prepares at armature 913 a circuit for relay 901 which is completed at armature 916 when relay 905 subsequently falls back.

Obviously the two arrangements for energizing relays 804 and 805 and relays 904 and 905 are interchangeable.

*Busy tone*

Regarding the arrangements provided for giving the calling subscriber, or the calling operator as the case may be, a busy signal in case any one of the selectors rotates off the last bank contact in its search for an idle trunk, it may be pointed out that each of the selectors, for example, the transmission selector repeater, Fig. 2, is provided with eleventh-rotary-step contacts to connect the associated busy signaling conductor to the talking circuit when the eleventh-rotary-step position is reached. The usual switch-over operation takes place at this time on account of the fact that the switching relay 111 pulls up when a ground potential is no longer encountered by test wiper 151 and switches the connection through to the open wipers 151 and 153. The flashing of the supervisory signal at the operator's position takes place in this case in the manner hereinbefore explained due to the alternate application of ground and battery potentials to the busy signaling conductor 501 to operate the battery feed relay 102.

Regarding the selector S, Fig. 1, it is assumed that this selector, in addition to being provided with eleventh-rotary-step contacts similar to those of the intermediate selector, Fig. 3, is provided with similar eleventh-rotary-step contacts, associated with conductor 158, to ground this conductor through a suitable resistance when the eleventh-rotary-step position is reached. This forms a return circuit for the flashing signaling current to operate the supervisory signal in the operator's cord circuit.

*Short-number calls*

Considering now the arrangement hereinbefore mentioned for freeing the director on short-number calls, it will be remembered that the sequence switch S′, Fig. 13, closes the switch-through circuit by means of its wiper 1212 at the end of the transmission of the last digit of a number containing the maximum number of digits. It will now be explained how the switch-through circuit is closed when a call is made containing less than the maximum number of digits. For this purpose it will be assumed that trunk lines (not shown) from the multiply connected bank contacts in the second level of the switches shown in Figs. 2, 11, and 12, extend directly to a group of connector switches, the second level of these switches then representing a hundred line group instead of a thousand line group as represented by their third level. Under the above assumption the listed numbers of the lines reached by way of the second level of the switches in Figs. 2, 11, and 12 contain the usual three digit office designation plus three subscriber digits, instead of four subscriber digits. Therefore, when a call is extended to one of these lines, only three of the digit registers shown in Fig. 16 are operated and the complete number is transmitted when the sender transmits the digit registered on the digit register DR—3, following which the wipers 1211 and 1212 of the sending switch S′ advance one step in the hereinbefore described manner and wiper 1212 grounds the conductor 1154 leading to the non-operated wiper of the digit register DR—4. In this case, the usual switch-over operation takes place in the connector in use when it completes its rotary movement, with the result that the switch-over operation in the incoming selector repeater, Fig. 11, is performed and the high resistance 1010 is cut in the bridge across conductors 818 and 819. This results in the usual switch-over operation in the reverse battery repeater shown in Fig. 9, which latter operation opens the circuit of the switch-through control relay 1345, Fig. 14, which has been supplying battery to the impulse circuit. Relay 1345 thereupon falls back and at armature 1350 applies ground to conductor 1335, this ground potential being obtained through the working contact and armature 1355 of relay 1347. This relay is energized because the switch-through operation follows immediately after the energization of relay 1347. Relay 1347, it will be remembered, cannot fall back until after the sending switch SS is restored and the slow acting relay 1346 has fallen back. Furthermore, the placing of ground on the unoperated wiper of the digit register DR—4 by the sequence switch S' closes a holding circuit over the conductor 1359 for relay 1347.

Responsive to the grounding of conductor 1335, the hereinbefore traced circuit including conductor 1302, resting contact and armature 788, resting contact and armature 777, armature 755 and its working contact, and the normally closed contacts controlled by armature 778 is closed for the switch-through relay 730 of the first selector repeater. The energization of relay 730 results in the director being freed in the hereinbefore described manner.

From the foregoing it is apparent that the director may be freed on the calling of a still shorter number in case a particular office contains only 100 lines.

What is claimed is:

1. In a telephone system, a selector repeater, a train of succeeding switches, means including said selector repeater and said switch train for connecting a calling and called line, a director for registering the called number and for controlling the setting of said switches, a circuit over which such control is effected, means responsive to the completion of the connection for converting said control circuit into a battery feed circuit for supplying talking current to the called line from said selector repeater, and means responsive to the said converting operation for releasing said director.

2. In a telephone system, a trunk line comprising two normally disconnected sections, an impulse repeater at the junction of said sections, a bridge across the first section at said repeater, a bridge including means for supplying current to the second of said sections closed when the repeater is taken into use, and means in said repeater responsive to the cessation of current flow in the second section for cutting off both bridges and for connecting said sections.

3. In an impulse repeater, an incoming circuit, an outgoing circuit, connections in said repeater for supplying current to said outgoing circuit, and means in said repeater controlled over said incoming circuit for reversing the current flow in said outgoing circuit while maintaining said connections intact.

4. In an impulse repeater, an incoming circuit, an outgoing circuit, a double wound impedance coil bridged across said outgoing circuit, a battery inserted between the two windings of said impedance coil to set up a current flow over said outgoing circuit, and means controlled over said incoming circuit for directly bridging said battery across said outgoing circuit so as to close a local circuit for each winding of said coil and reverse the direction of current flow in said outgoing circuit.

5. In a telephone system, a trunk line divided into two sections, a closed circuit including the second section, a repeater at the junction of the sections responsive to control over the first section to produce current impulses in said closed circuit, means outside of said repeater for opening said circuit, and means responsive to such opening for uniting said sections independent of said repeater.

6. In a telephone system, a line divided into two sections, means responsive to the seizure of the first section for bridging a source of current across the second section, a line relay connected to the first section, and contacts on said line relay for reversing the connections between said second section and the source of current.

7. In a telephone system, a trunk line divided into two sections, a source of current bridged across the second section of the trunk line through an impedance, and a relay controlled by a calling party over the first section of the trunk line for connecting a source of current across the second section of the trunk line independent of said impedance and in a direction opposite to the first said connection.

8. In a telephone system, a trunk line divided into two sections, a line relay energized over the first section of the trunk line responsive to the seizure thereof, a self-locking relay energized under the control of said line relay, contacts on said line relay for sending current impulses over the second section of said trunk line through contacts on said locking relay, and a connecting relay subsequently controlled over the second section of said trunk line to join the two sections together and to disconnect said line relay from the first section.

9. In a telephone system, a trunk line divided into two sections, a line relay bridged across the first section, a self-locking relay energized under the control of said line relay, contacts on said self locking relay for closing a bridge across the second section of the trunk line, said bridge including a control relay, contacts on said line relay for sending impulses over the second section, and a connecting relay subsequently energized through contacts on said self locking relay and through contacts on said control relay to disconnect said line relay from across the first section and to join the two sections of said trunk line together.

10. In a telephone system, a trunk line divided into two sections, a line relay bridged across the first section, a self-locking relay energized through contacts on said line relay to close a bridge across the second section of said trunk line, a control relay included in said bridge for feeding current to the second section, other contacts on said line relay for transmitting current impulses over the second section of the trunk line by reversing the direction of current flow therein, and a connecting relay subsequently energized through contacts on said self-locking relay and through contacts on said control relay to connect the two sections of the trunk line together and to disconnect said line relay from in bridge of the first section.

11. In a telephone system, a trunk line divided into two sections, a release trunk conductor associated with the first section, a control relay, a self-locking relay, a circuit including said release trunk conductor and contacts on said self locking relay for energizing said control relay when the trunk line is seized, contacts on said control relay for initially energizing said self-locking relay, contacts on self-locking relay for closing its self-locking circuit and for closing a bridge including said control relay across the second section of the trunk line, a line relay controlled over the first section of said trunk line for transmitting current impulses over the second section of the trunk line and through said bridge, and a connecting relay energized through contacts on said control relay and through contacts on said self-locking relay to join the two sections of said trunk line together and to disconnect said line relay from in bridge of the first section.

12. In an automatic switch, a line relay energized over the line circuit incoming to said switch, and means controlled by said relay on energizing, whereby it is converted to an electro-polarized relay to enable it to respond by retracting its armature each time the direction of current flow in said circuit is reversed from normal and by attracting its armature only when the direction of current flow is restored to normal.

13. In an automatic switch, a double wound line relay initially energized with both its windings in series to prepare the switch for operation, means for maintaining the direction of current flow in one winding unchanged, means for reversing the direction of current flow in the other winding to deenergize said relay, and means controlled by the deenergization of said relay for operating the switch.

14. In combination, a circuit, a relay energized by the setting up of a current flow in said circuit, and means initially controlled by the armature of said relay and tending to maintain its established polarity thereafter independent of the position of said armature, whereby the relay responds to reversals of current in said circuit but not to interruptions thereof.

15. In combination, a circuit, a relay, and circuit connections such that said relay is energized upon the establishment of current flow in said circuit but is deenergized only upon the reversal of current flow in said circuit and not upon the mere cessation thereof, said circuit connections including a polarizing winding for said relay, and means responsive to the energization of the relay for setting up a current flow in said winding and for maintaining the current flow while the relay is being actuated and deactuated over said circuit.

16. In an automatic switch, a double wound line relay having both windings normally bridged across the talking conductors, means for connecting one winding in a local circuit to enable the relay to operate as a polarized or differential relay while the switch is being set, and means for again connecting said windings in their former bridged relation after the switch is operated.

17. In a telephone system, an automatic switch, an electro-polarized relay having two windings, a polarizing winding and an operating winding, means for reversing the current flow through the said operating winding, contacts on said relay operated responsive to such reversals of current flow to bring about the operation of the switch, and means controlled by said relay while the switch is operating to maintain current flow in the polarizing winding.

18. In a telephone system, a trunk line, a double wound relay having both its windings connected in series across said trunk line, means for setting up a current flow through the two windings of the relay, contacts on the relay operated responsive to this current flow, and means controlled by said contacts for disconnecting one of the windings of said relay from in bridge of the trunk line and for closing a local circuit for it and for completing the bridge across the trunk line through the other winding.

19. In a telephone system, a trunk line, an electro-polarized relay having its two windings normally connected in series across said trunk line, means responsive to a seizure of said trunk line for setting up a current flow to energize both windings of the electro-polarized relay in series, means controlled by the energization of the said relay for removing its polarizing winding from in bridge of the trunk line and for closing a local energizing circuit for such winding, means for reversing the direction of current flow in the trunk line a number of times, and an automatic switch responsive to the operation of said electro-polarized relay brought about by such reversals to further extend said trunk line.

20. In a multi-office telephone system, an office containing switches operated according to the system in which the final switch supplies talking battery to the calling and called lines on local calls, a second office containing switches operated according to the system in which a switch other than the final switch supplies talking battery to the calling and called lines on local calls, and means including switches of both kinds for setting up a connection from a calling line in the first office to a called line in the second office.

21. In a multi-office telephone system, an incoming selector repeater in one of the offices, a two-wire control circuit incoming to said selector repeater from another office, a two-wire control circuit outgoing from said selector repeater for operating local switches, and means for supplying current to both said circuits from said selector repeater.

22. In a telephone system, a trunk line divided into two sections, two closed circuits including the two sections, respectively, a repeater at the junction of said sections responsive to interruptions in the first section to produce current impulses in said second section, means outside said repeater for interrupting the current flow in the second section, means for re-establishing the current flow in the second section, and means operative for the first time responsive to the last named operation for reversing the direction of current flow over the first section.

23. In a multi-office telephone system, a terminating office, a selector repeater in said office terminating a trunk from a second office, another selector repeater terminating a trunk from a third office, means in said second office for transmitting impulses to said first named selector repeater by interrupting the trunk circuit, current being supplied from said first selector repeater, means in said third office for transmitting impulses to said second selector repeater and for supplying the necessary current, and means in both selector repeaters for transmitting impulses to local switches in said terminating office and for supplying the current used in producing such impulses.

24. In a telephone system, means including a selector and a connector for extending a connection to a called line, a ringing control conductor extending between said switches and grounded at said selector, a locking ring cut-off relay in said connector energized over said conductor from the ground potential applied thereto in the selector, means controlled independent of said conductor for removing the ground potential from said conductor at the selector, and means in said connector for altering the connection between said ring cut-off relay and said conductor whereby a further application of ground potential to said conductor at the selector results in a deenergization of the relay.

25. In a telephone system, means including a selector and a connector for extending a connection to a called line, a ringing control conductor extending between said switches, means in the selector for applying a ground potential to said conductor to operate said ring-cut-off relay prior to the completion of the operation of said connector switch, and means responsive to the completion of the operation of said connector switch for controlling the disconnection of ground from said conductor in said selector over a circuit path independent of said conductor and for altering the connection between said conductor and said relay so that a subsequent application of ground potential to said conductor results in a deenergization of said relay.

26. In a telephone system, a trunk line divided into two sections, two closed circuits including the two sections, respectively, a repeater at the junction of said sections responsive to interruptions in the first section to produce current impulses in said second section, means outside said repeater for interrupting the current flow in the second section, and a relay non-responsive to impulses produced at said repeater and responsive to the operation of the last named means to reverse the direction of current flow in the first section.

27. In a telephone system, a trunk line divided into two sections, two closed circuits including the two sections, respectively, a repeater at the junction of said sections responsive to interruptions in the first section to produce current impulses in said second section, means outside said repeater for interrupting the current flow in the second section, a relay non-responsive to impulses produced at said repeater and responsive to the operation of the last named means to reverse the direction of current flow in the first section, means for re-establishing the current flow over the second section, and means responsive thereto for stopping the current flow over the first section.

28. In a telephone system, an automatic switch having a primary movement and two secondary movements, a line extending to said switch, a line relay, means controlled by said line relay when it is controlled over the associated line to operate said switch in its primary movement and in its first secondary movement, and means for closing a local circuit for said line relay whereby it is intermittently operated independent of control over said line to control the second secondary operation of said switch.

29. In a telephone system, an automatic switch having a directed primary movement and a free hunting secondary movement, a line individual to said switch having two talking conductors, a double wound line relay operated through one winding and over the two line conductors of said line in series to control the primary movement of the switch, and means for subsequently operating the other winding in a local circuit to control the said secondary movement of the switch.

30. In a telephone system, a two motion automatic switch, having wipers, a relay, an operating circuit, means for energizing said relay to connect said operating circuit to said primary magnet whereby the primary magnet is controlled over said operating circuit to impart the primary motion to said wipers and for deenergizing said relay to disconnect said operating conductor from said primary magnet and for connecting it instead to the said secondary magnet whereby the secondary motion is imparted to said wipers, and means responsive upon the termination of the rotary motion of the said wipers for again energizing said relay to connect said wipers to the switch.

31. In a telephone system, an automatic switch having primary and secondary movements, a line relay for controlling said switch, a release relay for bridging said line relay across the line conductors of said switch, and means including contacts operated upon the beginning of the secondary movement of said switch for deenergizing said release relay to disconnect said line relay from across the associated line conductors.

32. In a telephone system, a trunk line having two talking conductors, means including an automatic repeater and an automatic switch for extending a connection from a calling line to said trunk line, a line relay bridged across the talking conductors of said trunk line, means at said repeater for supplying current over the connection to energize said line relay, means responsive to the completion of said connection for cutting out said repeater, a battery feed relay, and means for removing said line relay from in bridge of said trunk line and for substituting said battery feed relay to supply current to said calling line.

33. In a telephone system, a trunk line divided into two sections, a repeater at the junction of said sections, an automatic switch terminating the second section, a second trunk line, means for operating said repeater over the first of said sections to transmit impulses to operate said switch, means including said switch when so operated for extending a connection from the said second section to a called line via said second trunk line, and means controlled over said second trunk line and responsive to the establishment of said connection for uniting said sections independent of said repeater.

34. In a telephone system in which first selector repeaters supply talking battery to calling lines, trunk lines leading to a manual switchboard provided with battery feed relays, and means in the selector repeaters operated on calls to said switchboard to conductively extend the calling lines through to said trunk lines and to open the battery feed connections at the selector repeaters.

35. In a telephone system, a train of switches for connecting a calling and a called line, a director for registering the called number and for controlling the setting of said switches, a circuit over which such control is effected, means responsive to the completion of the connection to the called line for opening said control circuit, and means responsive to the opening of said control circuit for releasing said director.

36. In a telephone system, a train of switches for connecting a calling and a called line, a director, means for appropriating said director for registering the called number and for controlling the setting of said switches, a circuit over which such control is effected, means responsive to the completion of the connection to the called line for opening said control circuit, and means responsive to the opening of said control circuit for freeing said director.

37. In a telephone system, a train of switches for connecting a calling and a called line, a director for registering the called number and for controlling the setting of said switches, a circuit over which such control is effected, means responsive to the completion of the connection to the called line for establishing a battery feed circuit, said circuit including a portion of said control circuit, and means for releasing said director at the same time the said battery feed circuit is established.

38. In a telephone system, a train of switches for connecting a calling and a called line, a director for registering the called number and for controlling the setting of said switches consecutively, a circuit over which such control is effected, and means responsive to the opening of said control circuits effected when any switch in being operated fails to connect with a succeeding switch for interrupting the operation of said director and for releasing said director.

39. In a telephone system, a train of switches for connecting a calling and a called line, a director for registering the called number and for controlling the setting of said switches consecutively, a circuit over which such control is effected, and means responsive to the opening of said control circuit effected when any switch in being operated fails to connect with a succeeding switch for giving the calling subscriber a busy signal and for releasing said director.

40. In combination, a relay having two windings, means whereby said relay is initially energized over said two windings in series, means responsive to said initial energization for closing a local circuit for one of said windings so that said relay is non-responsive to interruptions of current in the other of said windings, and means for reversing the current in the other of said windings to cause said relay to respond.

41. In combination, a relay having two windings, means whereby said relay is initially energized over said two windings in series, means responsive to said initial energization for closing a local circuit for one of said windings so that said relay is responsive to reversals of current in the other of said windings but not to interruptions of current, and means for maintaining said local circuit independent of the operation of said relay.

42. In a telephone system, a train of switches for connecting a calling and a called line, a director for registering the called number and for controlling the setting of said switches in accordance with a translated number different than the called number, a circuit over which said control is effected, means responsive to the completion of the connection to the called line for opening said control circuit, and means responsive to the opening of said control circuit for releasing said director.

43. In a telephone system, a train of switches for connecting a calling and a called line, a director for registering the called number and for controlling the setting of said switches, a circuit over which said control is effected, means in the final switch responsive to the completion of the connection to the called line for opening said control circuit, and means responsive to the opening of said control circuit for releasing said director.

44. In a telephone system, a train of switches for connecting a calling and a called line, a register controlled by the party on the calling line for registering the called number, a sender for controlling the setting of said switches, a circuit over which said control is effected, means responsive to the completion of the connection to the called line for opening said control circuit, and means responsive to the opening of said control circuit for releasing said register.

45. In a telephone system, a train of switches for connecting a calling and a called line, a director, means for appropriating said director for registering the called number and for controlling the setting of said switches, a circuit over which said control is effected by the intermittent opening and closing thereof under the control of said director, means responsive to the completion of the connection to the called line for opening said control circuit, and means responsive to the opening of said control circuit at the completion of said connection for freeing said director.

46. In a telephone system, a train of switches for connecting a calling and a called line, a director for registering the called number and for controlling the setting of said switches, a circuit over which said control is effected, a relay responsive to the completion of the connection to the called line, and contacts on said relay for establishing a battery feed circuit and for releasing said director.

47. In a telephone system wherein an automatic switch having a directive trunk-group selecting movement and an automatic trunk hunting movement has a pair of talking conductors incoming thereto and a line relay controlled over said incoming talking conductors in series to control the directed group selecting movement of the switch, said switch having a test wiper for testing trunks in the selected group, and means for reoperating said line relay under the control of said test wiper to control the automatic trunk-hunting movement of the switch.

48. In an automatic switch as claimed in claim 47, said line relay having two windings, one of said windings being included in a circuit over the two talking conductors in series, and means in the switch for opening said series circuit upon the termination of the directed movement of the switch and for connecting up the other winding of the relay so that it is effective as set forth to control the relay under the control of the test wiper during the automatic trunk-hunting movement.

49. A telephone system including selector switches for use only in local connections, selector switches for use only in toll connections, other selector switches accessible to all of said first switches for use in either local or toll connections, connector switches accessible to said other switches for use in either local or toll connections, and means for operating the connectors differently depending on the type of connection in which they are used.

50. A telephone system including selector switches for use only in local connections, selector switches for use only in toll connections, other selector switches accessible to all of said first switches for use in either local or toll connections, connector switches accessible to said other switches for use in either local or toll connections, means for operating certain of said switches in a train to extend a connection to a called line, and means for adapting the connector involved for automatically signalling the called line responsive to the establishment of the connection therewith only when the connection is a local one.

51. In a telephone system, a subscriber controlled selector, an operator controlled selector, another selector accessible to first said selectors, a connector accessible to said other selector, means for operating either of the first said selectors, said other selector and said connector to establish a connection with a called line, and automatic means for varying the operation of the connector depending on the particular one of said first selectors used in extending the connection.

52. In a telephone system, a first automatic switch, a second automatic switch, a third automatic switch accessible to said first two switches, a fourth automatic switch accessible to said third switch, a calling subscriber, a manual operator, a called line, means controlled by the subscriber for directively operating the first, third and fourth switches to extend a connection to the called line, means controlled by the operator for directively operating the second, third and fourth switches to extend a connection to said called line, and automatic means dependent upon which of said first or second switches is involved in the connection for determining what specific operation the fourth switch will be adapted to perform.

53. In a telephone system, a subscriber controlled selector, an operator controlled selector, another selector accessible to said first selectors, a connector accessible to said other selector, a called line, means for establishing a connection over either of said first selectors, said other selector and said connector to the called line, and means for adapting the connector to signal the called line automatically responsive to the establishment of the connection therewith or to defer signalling the called line depending upon the particular one of said first selectors over which the connection is extended.

54. In a telephone system, a called line, a connector switch, a selective switch having access to said first switch, local switches and toll switches having access to said selective switch, subscriber controlled means for directively operating a local switch, said selective switch and said connector to establish a local connection to the called line, operator controlled means for directively operating a toll switch, said selective switch and said connector to establish a toll connection with the called line, and means controlled by the particular switch employed in the connection preceding said selective switch for adapting said connector to either apply signalling current to the called line responsive to the establishment of the connection therewith or to withhold the signalling current from the called line pending further controlling operations.

55. A telephone system including local selectors, toll selectors, combination local and toll selectors and connectors, means for establishing local connections over a switch train comprising a local selector, a combination selector and a connector, means for establishing toll connections over a switch train comprising a toll selector, a combination selector and a connector, and means for adapting the connector to operate either as a local connector or as a toll connector depending on the switch train involved in the connection.

56. A telephone system including local selectors, toll selectors, combination local and toll selectors, and connectors, means for establishing a local connection over a switch train comprising a local selector, a combination selector and a connector, means for establishing a toll connection over a switch train comprising a toll selector, a combination selector and a connector, and means dependent upon the switch train employed in the connection for causing the connector to operate in a specific manner in local connections and in a different manner in toll connections.

57. In a telephone system, a combination local and toll connector, a combination local and toll selector having access to said connector, local and toll switches having access to said selector, means for establishing a connection involving either a local switch or a toll switch and said selector and connector, and means for adapting the connector for either local or toll operation depending upon whether a local switch or a toll switch is involved in the connection.

58. In a telephone system, toll switches, local switches, a selector switch, a connector switch, a four-conductor trunk extending from the banks of the toll switches to said selector, multiple connections from three of the trunk conductors extending to the banks of said local switches, means for extending a connection to said selector via either the local switches or the toll switches and said trunk, means for directively operating said selector and said connector over the connection, and means operated over the fourth conductor of the trunk in connections extended via a toll switch for adapting the connector to function as a toll connector.

59. In a telephone system, a toll and local connector, a selector, four conductors incoming to the selector, a set of contacts terminating said four conductors accessible to toll selectors, a set of contacts terminating three of said conductors accessible to local selectors, means for extending a connection to the selector over either set of contacts, means for operating the selector and connector to further extend the connection, and means dependent upon the particular set of contacts over which the connection is extended for determining the operating characteristics of the connector.

60. In a telephone system, a trunk line comprising four conductors terminating in an automatic switch, a second automatic switch accessible to said first switch, means for extending a connection over three conductors of the trunk line and said two switches, means for extending a connection over the four conductors of the trunk line and said two switches, signalling means in the second switch automatically operative in said first connection, and means for rendering said signalling means controllable over the fourth conductor of the trunk line in said last connection.

61. In a telephone system, a trunk line, a selective switch on the trunk line for extending talking connections away from the trunk line, a called line accessible from the selective switch, a relay connected in bridge of the talking conductors of the trunk line, another relay adapted for being connected in bridge of the talking conductors of the trunk line antecedent to the location of first said relay on the trunk line, means controlled over the talking conductors of the trunk line for directively operating the first said relay to thereby operate the selective switch to select the called line, and means operated responsive to the selective operation for disconnecting the first said relay and for substituting the second said relay in bridge of the talking conductors of the trunk line at said antecedent location.

62. In an automatic telephone system, a trunk line and terminating automatic switch mechanism at the far end of the trunk line, an operator's switching link for co-operation with the near end of the trunk line, a relay for said link, a called line accessible from said switch mechanism, means operated responsive to said switch mechanism connecting to the called line for causing the relay to operatively attract its armature, and means controlled over the called line for retracting the armature of said relay.

63. In an automatic telephone system, a calling line, switch mechanism for extending connection from the calling line to the terminals of the called line, means for placing a busy bar potential on a terminal of the called line to prevent effecting a talking connection to the connected to called line, and means operated responsive to operating the switch mechanism into connection with the terminals of the called line for manifesting a signal on the calling line regardless of whether the said potential exists on the terminal.

64. A telephone system comprising a subscriber's station, a control office, a plurality of switching stages at said office, a transmission bridge at one of said switching stages, and a direct metallic circuit extending from the subscriber's station to a switching stage following that at which said transmission bridge is located.

JOHN WICKS.